United States Patent
Kashmiri et al.

(10) Patent No.: US 12,494,793 B1
(45) Date of Patent: Dec. 9, 2025

(54) TECHNIQUES FOR FILTERING AGGRESSOR SIGNALS FROM BIOPOTENTIAL SIGNALS, AND CIRCUITS IMPLEMENTING THE TECHNIQUES

(71) Applicant: Meta Platforms Technologies, LLC, Menlo Park, CA (US)

(72) Inventors: Sayyed Mahdi Kashmiri, San Jose, CA (US); Filipp Demenschonok, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 232 days.

(21) Appl. No.: 18/353,803

(22) Filed: Jul. 17, 2023

Related U.S. Application Data

(60) Provisional application No. 63/400,038, filed on Aug. 22, 2022.

(51) Int. Cl.
*H03M 1/06* (2006.01)
*G06F 3/01* (2006.01)
*H03M 1/08* (2006.01)

(52) U.S. Cl.
CPC ............ *H03M 1/08* (2013.01); *G06F 3/014* (2013.01); *G06F 3/015* (2013.01)

(58) Field of Classification Search
CPC .......... H03M 1/08; G06F 3/014; G06F 3/015
USPC .......................................... 341/150, 118, 120
See application file for complete search history.

(56) References Cited

U.S. PATENT DOCUMENTS

| | | | |
|---|---|---|---|
| 6,404,829 B1 * | 6/2002 | Sonu ................ | G11B 20/10009 375/345 |
| 2009/0167578 A1 * | 7/2009 | Takahashi .......... | H03M 1/1033 341/120 |
| 2018/0168473 A1 * | 6/2018 | Du .......................... | A61B 7/04 |
| 2018/0208222 A1 * | 7/2018 | Zhang ...................... | B60L 1/00 |
| 2019/0380654 A1 * | 12/2019 | Felix .................... | A61B 5/2415 |
| 2021/0267552 A1 * | 9/2021 | Moghaddambagheri .................... | A61B 5/316 |

* cited by examiner

*Primary Examiner* — Peguy Jean Pierre
(74) *Attorney, Agent, or Firm* — Morgan, Lewis & Bockius LLP

(57) ABSTRACT

The various implementations described herein include techniques and apparatuses for multi-channel biopotential signal acquisition, biopotential signal pre-processing, and adaptive signal conditioning. In one aspect, an apparatus is provided for adaptive signal conditioning for biopotential acquisition. The apparatus includes an analog circuit configured to amplify biopotential signals, and a mixed-signal circuit (e.g., which can include an adaptive digital algorithm) coupled to the analog circuit and configured to suppress aggressor signals such as baseline wandering signals and power-line-induced noise in the biopotential signals before amplification of the biopotential signals.

20 Claims, 31 Drawing Sheets

TECHNIQUES FOR FILTERING AGGRESSOR SIGNALS FROM BIOPOTENTIAL SIGNALS, AND CIRCUITS IMPLEMENTING THE TECHNIQUES

PRIORITY AND RELATED APPLICATIONS

This application claims priority to U.S. Provisional Patent Application No. 63/400,038, entitled "Techniques for Digitally Filtering Aggressor Signals Before Amplifying Biopotential Signals and for Using Analog Correlators to Perform a Wake-Up Function for Biopotential-Processing Components, and Integrated Circuits Implementing the Techniques" filed Aug. 22, 2022, which is hereby incorporated by reference in its entirety.

TECHNICAL FIELD

The present disclosure relates generally to biopotential signal (e.g., muscular response or electromyography) acquisition and interpretation, including, but not limited to, techniques and apparatuses for multi-channel biopotential signal acquisition, biopotential signal pre-processing, and/or adaptive signal conditioning.

BACKGROUND

Biopotential signals (e.g., EMG signals) can be a useful means of detecting user movements and gestures (e.g., in-air hand gestures during which a user might pinch together a finger and thumb). The detection and interpretation of user movements and gestures can enable a system (such as an artificial-reality system) to be responsive to the user movements and gestures. However, conventional means of detecting (sensing) biopotential signals are susceptible to noise, such as motion artifacts, baseline wandering, and power-line induced noise. These noise sources can lead to erroneous results and poor-quality human-machine interactions.

Power consumption for systems that process biopotential signals can also be an issue, e.g., because in some instances the machine-learning models used to process and categorize the biopotential signals can require a relatively high amount of power to function. Thus, low-power techniques used to wake-up these machine-learning models at appropriate times are needed. An analog-based (and low-power consumption) technique used to wake-up digital signal-processing components would be desirable to address this issue.

SUMMARY

The apparatuses, systems, devices (e.g., wearable devices) and methods described herein address at least some of the above-mentioned drawbacks by reducing and/or compensating for noise. In accordance with some embodiments, an apparatus is provided for adaptive signal conditioning for biopotential acquisition. The apparatus includes an analog circuit configured to amplify biopotential signals, and a mixed-signal circuit (e.g., which can include an adaptive digital algorithm) coupled to the analog circuit and configured to suppress aggressor signals comprising baseline wandering signals and power-line-induced noise in the biopotential signals before amplification of the biopotential signals.

In accordance with some embodiments, a system is provided for multi-channel biopotential acquisition. The system includes: (i) a plurality of adaptive signal-conditioning circuits, each adaptive signal-conditioning circuit coupled to a respective electrode of a multi-channel biopotential-acquisition device, each signal-conditioning circuit comprising: (a) an analog circuit configured to (1) receive biopotential signals from the respective electrode and (2) amplify the biopotential signals; and (b) a mixed-signal circuit coupled to the analog circuit and configured to suppress aggressor signals comprising baseline wandering signals and power-line-induced noise in the biopotential signals before amplification of the biopotential signals; and (ii) a central processing circuit coupled to the plurality of adaptive signal-conditioning circuits, the central processing unit configured to extract raw digitized electrode signals from each channel of the multi-channel biopotential-acquisition device and program the plurality of adaptive signal-conditioning circuits.

Other aspects include an analog-based (and low-power consumption) technique used to wake-up digital biopotential-signal-processing components. In accordance with some embodiments, an apparatus is provided for processing biopotential signals. The apparatus includes: (i) a plurality of analog correlators, each analog correlator configured to: (a) receive time-series analog signals from an electrode of a biopotential-acquisition device; and (b) correlate the time-series analog signals with a respective filter impulse response to identify a respective degree of correlation; and (ii) a plurality of comparators, each comparator coupled to a respective analog correlator and configured to detect peaks in the respective degree of correlation.

In some embodiments, a computing device (e.g., a wrist-wearable device or a head-mounted device, or an intermediary device, such as a smartphone or desktop or laptop computer that can be configured to coordinate operations at one or more wearable devices) includes one or more of the apparatuses, circuits, and/or systems described herein.

Thus, methods, apparatuses, devices, and systems are disclosed for biopotential signal (e.g., neuromuscular signal, such as electromyography signal) detection and interpretation. Such methods, apparatuses, devices, and systems may complement or replace conventional methods for neuromuscular-signal detection and interpretation.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIGS. 9A, 9B-1, 9B-2, and 9C illustrate example artificial-reality systems in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure includes biopotential (e.g., electromyography (EMG)) acquisition and/or measurement circuits (e.g., integrated circuits such as application-specific integrated circuits (ASIC)) and apparatuses. The circuits and apparatuses include various active noise and feedback mechanisms to address various non-idealities in the biopotential (e.g., EMG) signal (e.g., power line noise, motion artifacts and offsets).

The circuits and apparatuses described herein eliminate, reduce, suppress, or mitigate noise sources (sometimes called aggressors), such as electrode offset (e.g., due to the human motion artifacts), baseline wandering, and power line (e.g., a 50/60 Hz power line) induced noise before amplification of the small biopotential signals. The noise signals such as baseline wander and interference are generally much larger than the biopotential signal of interest. For example, a noise signal may be hundreds of mV whereas the biopotential signal may be in the range of tens of microvolts to a few millivolts.

Figure 1A:
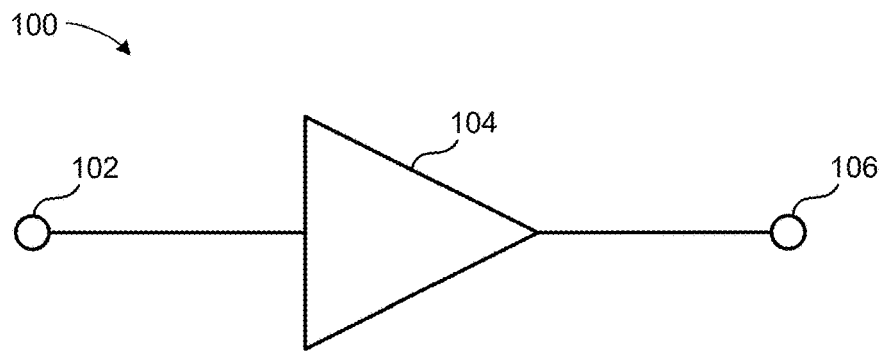
FIGS. 1A-1B show example frontends in accordance with some embodiments.
Figure 1A:
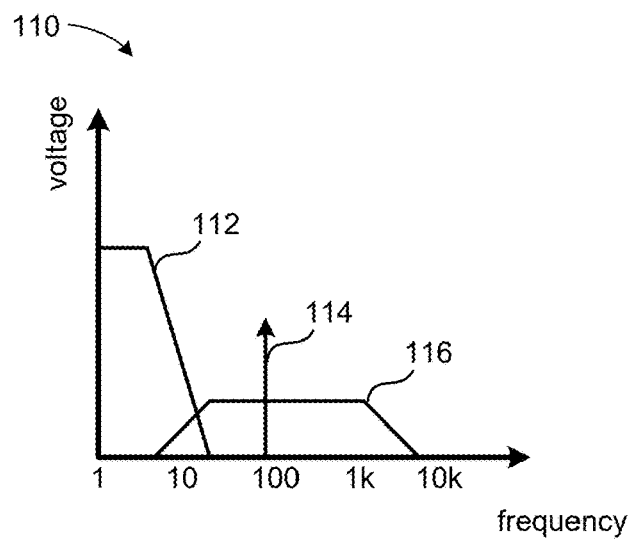
Figure 1A:
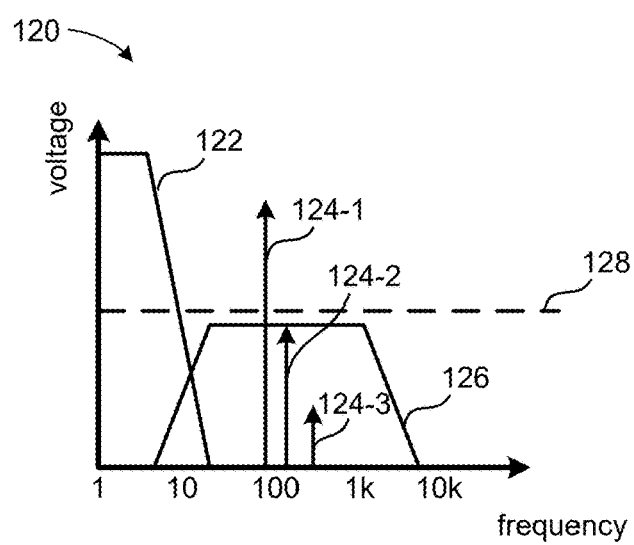

If both the noise signals and the signal of interest go through a signal conditioning analog frontend with a same (or similar) rate of amplification, the signal path saturates due to the noise signals resulting in significant degradation of functionality and performance (e.g., as illustrated in FIG. 1A). By suppressing the noise signals before amplification of the signal of interest, a larger gain can be utilized that enables a better SNR and system optimization in terms of power consumption and size.

FIG. 1A shows an amplifier component 104 with an input 102 and an output 106. FIG. 1A also shows an input graph 110 showing signals at the input 102. The signals in input graph 110 include a baseline wander signal 112, power-line-induced noise 114, and a desired signal 116 (e.g., a biopotential signal). FIG. 1A also shows an output graph 120 showing signals at the output 106 that correspond to the signals in the input graph 110. The signals in the output graph 120 include a baseline wander signal 122, power-line-induced noise signals 124-1, 124-2, and 124-3, and desired signal 126. The output graph 120 also includes line 128 indicating the system dynamic range, where signals above the line 128 cause saturation.

Figure 1B:
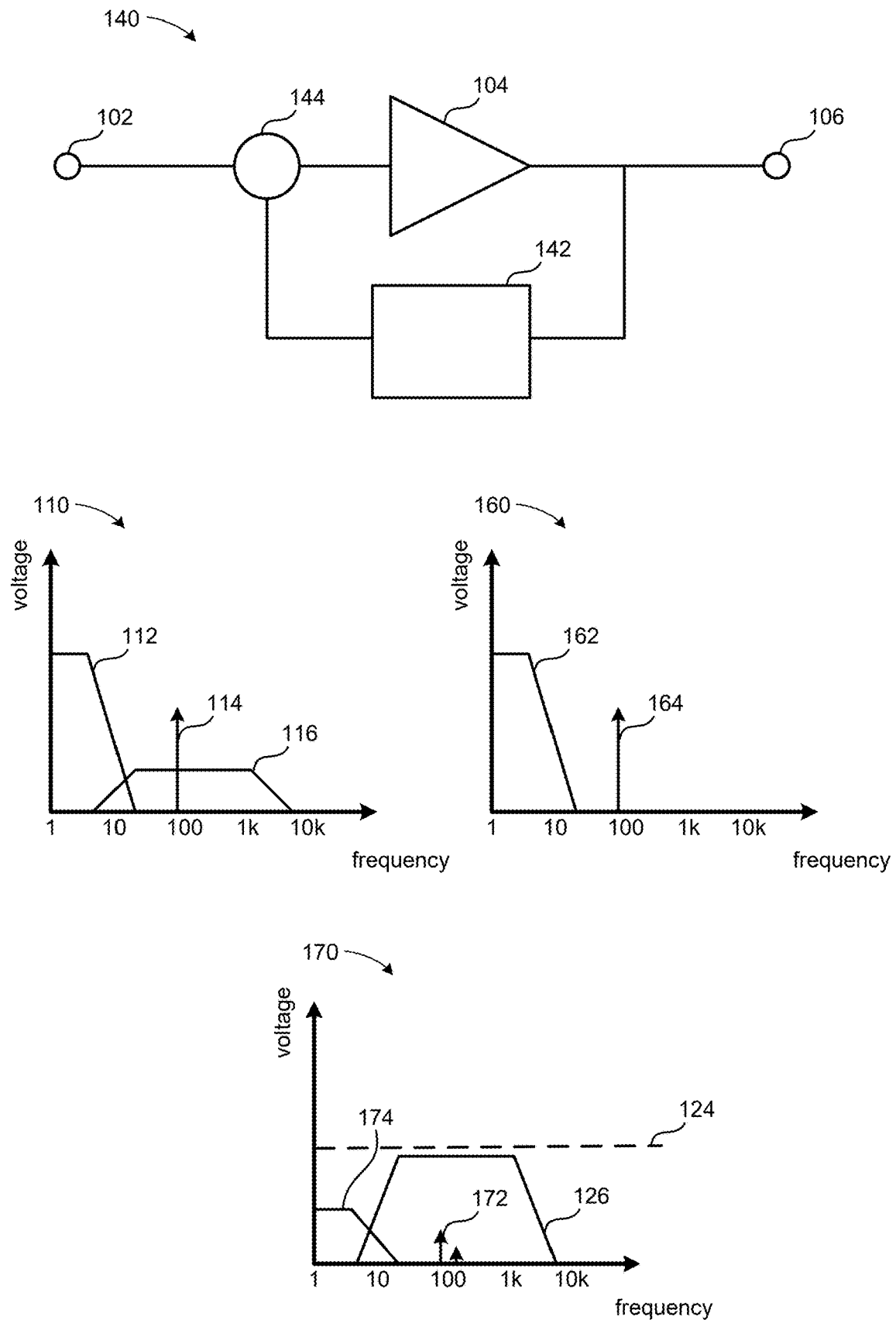

FIG. 1B shows an example analog frontend that employs an adaptive digital algorithm embedded on the same chip to detect the signature of the aggressor signals at the output of the signal path and feedback the appropriate compensation signals to the input in order to suppress those before they are processed by the frontend. FIG. 1B shows a circuit 140 that includes the input 102, the amplifier 104, and the output 106 in accordance with some embodiments. The circuit 140 also includes a feedback component 142 and a combiner component 144 (e.g., a summer or subtractor component). The feedback component 142 is configured to generate compensation signals and the combiner component 144 is configured to combine the compensation signals with the input signals. The compensation signals are adapted to reduce or cancel out aggressor signals in the input signals (e.g., the baseline wander signal 112 and the power-line-induced noise signal 114). In some embodiments, the feedback component implements an adaptive algorithm (e.g., an analog adaptive algorithm or a digital adaptive algorithm). FIG. 1B also shows the input graph 110, a feedback graph 160, and an output graph 170. The feedback graph 160 shows signals output by the feedback component 142, including a baseline compensation signal 162 and a power-line-induced noise compensation signal 164. The output graph 170 shows signals at the output 106, including a compensated baseline wander signal 174, a compensated power-line-induced noise signal 172, and the desired signal 126. As illustrated in FIG. 1B, the feedback component 142 and the combiner component 144 operate to reduce aggressor signals at the output 106.

Figure 2A:
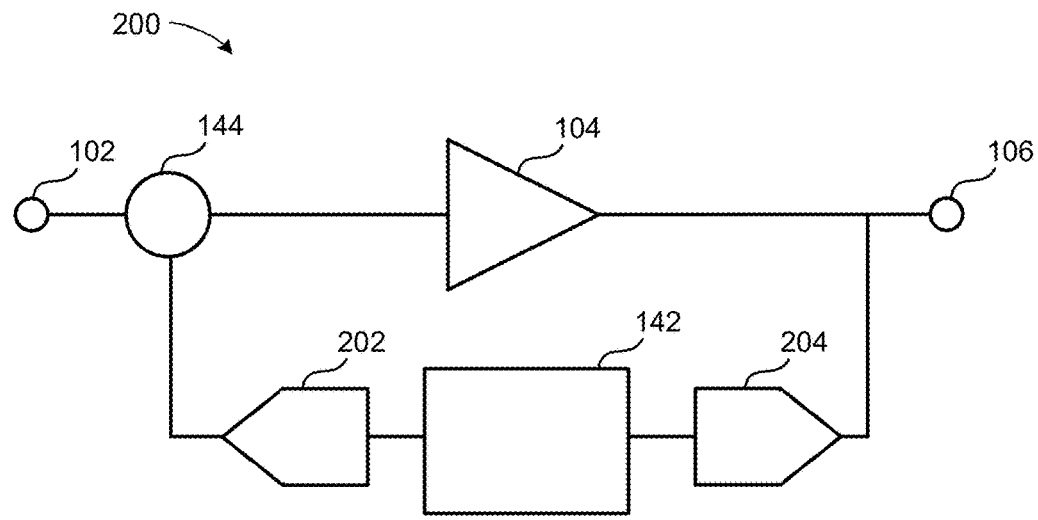
FIG. 2A shows an example digital adaptive interface in accordance with some embodiments.

FIG. 2A shows a circuit 200 that includes the input 102, the amplifier 104, and the output 106 in accordance with some embodiments. The circuit 200 further includes an analog-to-digital component 204, the feedback component 142, a digital-to-analog component 202, and the combiner component 144. In this way, analog signals from the output of the amplifier 104 are converted to digital signals for the feedback component 142 and the outputs of the feedback component 142 is convert to analog signals for combining with input signals of the amplifier 104. In some embodiments, for digital adaptation, a layer of analog-to-digital and digital-to-analog converters are coupled around an amplifier to interface between the analog and digital domains (e.g., as shown in FIG. 2A). In some embodiments, the level of precision and performance of these converters depends on the desired tolerance in the residual aggressors after compensation and hence do not have to be as high as the high fidelity biopotential acquisition signal path requires.

In some embodiments, the feedback component 142 implements a digital adaptive algorithm. A benefit of a digital adaptive algorithm is that it can be designed with flexibility and desired functionalities to track the variation of the aggressors, in contrast to less flexible purely analog compensation techniques. Furthermore, digital assistance to the analog circuits enables saving area usually occupied by the passive components needed around the analog circuits, for instance by implementing large time constants digitally, rather than the use of large off-chip capacitors.

Figure 2B:
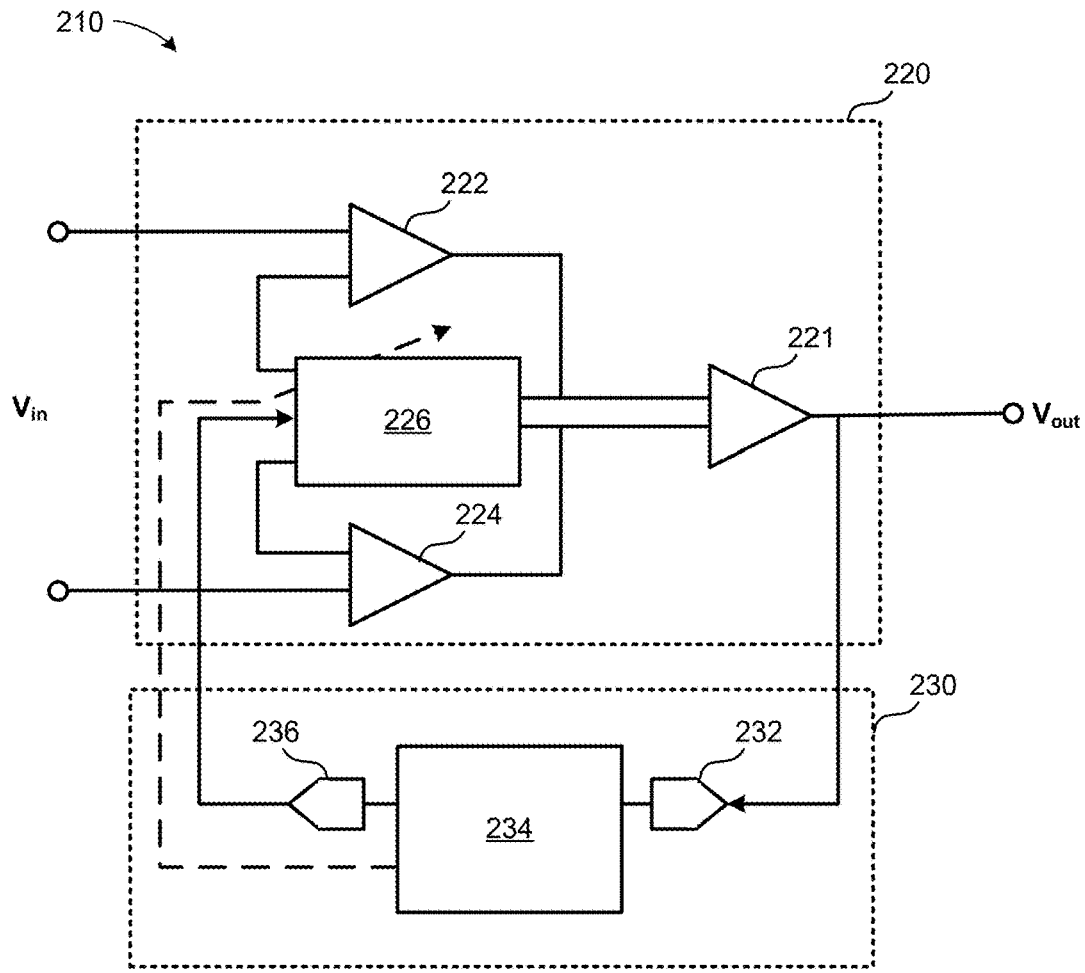
FIGS. 2B-2D shows example applications of digital adaptive interfaces in accordance with some embodiments.

An example employing a compensation technique to an operational amplifier (e.g., a 3-opamp instrumentation amplifier) is shown in FIG. 2B. FIG. 2B shows a circuit 210 that includes an operational amplifier component 220 (with input Vin) and a compensation component 230 in accordance with some embodiments. The operational amplifier component 220 includes comparators 221, 222, and 224, and a feedback network 226. The compensation component 230 includes an analog-to-digital component 232, a feedback component 234, and a digital-to-analog component 236. In some embodiments, the feedback component 234 implements an adaptive digital compensation algorithm. In some embodiments, the feedback component 234 generates one or more signals for controlling/adjusting the operation of the feedback network 226. In some embodiments, the compensation component 230 is a mixed-signal adaptation engine.

As shown in FIG. 2B, digital adaptation is applied to an example operational amplifier. In some embodiments, other types of amplifiers are used. The circuit 210 shown in FIG. 2B has an analog input signal Vin amplified to an analog output signal Vout through the amplifier 220. The gain of the amplifier 220 is determined by the feedback network 226. A compensation path that is controlled and implemented by the compensation component 230 (e.g., a mixed-signal adaptation engine). For example, the compensation component 230 detects the undesired aggressor signals at the output through the analog-to-digital converter (ADC) feeding a digital representation of the signal to a digital adaptive algorithm that then drives a compensation signal through a digital-to-analog converter (DAC) to the analog domain in order to subtract the undesired signals. The gain of the amplifier 220 can also be regulated through another digitally controlled knob, controlling its feedback network for the purpose of automatic gain control.

Figure 2C:
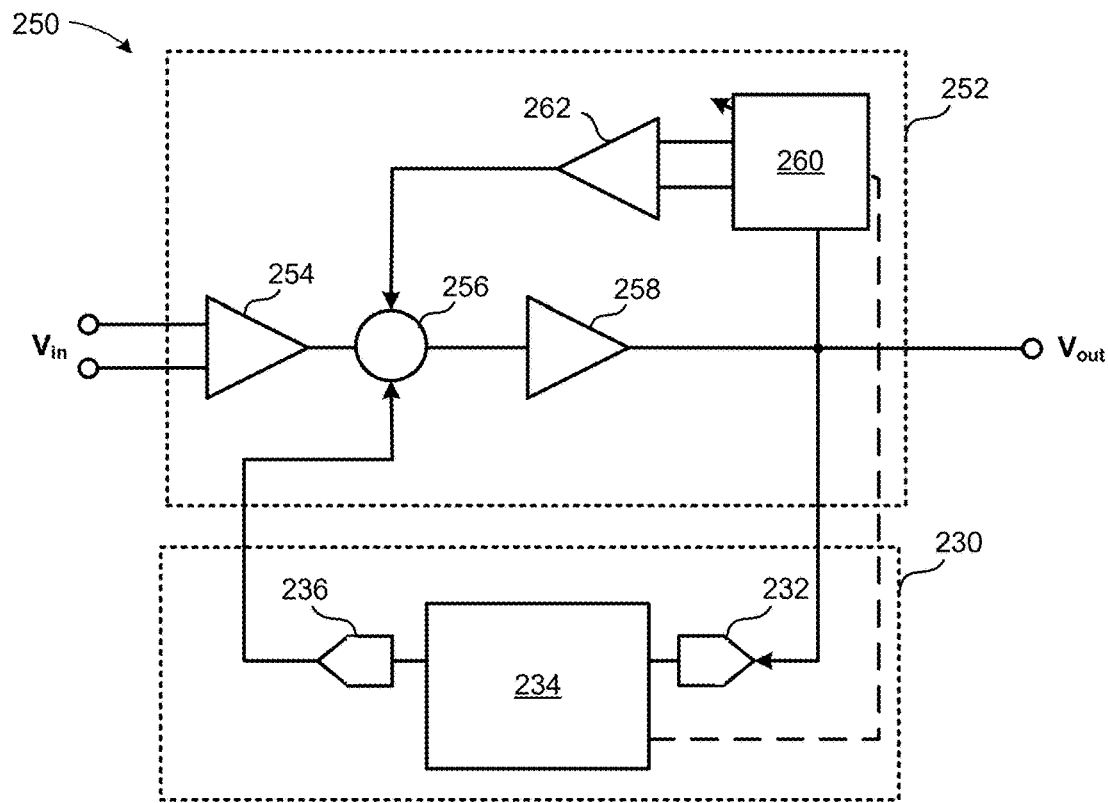
Figure 2D:
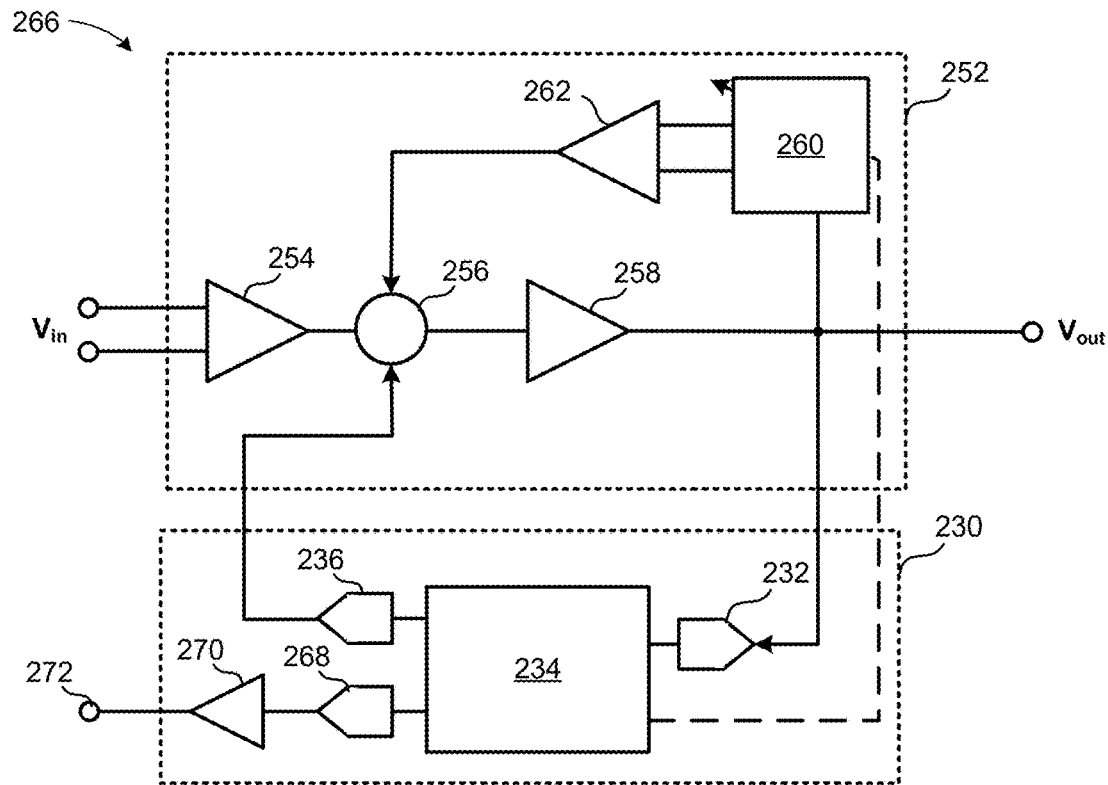

FIG. 2C illustrates a similar example employing the compensation technique to a current feedback instrumentation amplifier. FIG. 2C shows a circuit 250 that includes an amplifier component 252 and the compensation component 230 in accordance with some embodiments. The amplifier component 252 includes transconductors 254 and 262, amplifier 258, combiner component 256, and feedback network 260. FIG. 2D shows an example of an instrumentation amplifier similar to the amplifier shown in FIG. 2C, except that FIG. 2D includes an output 272 and a corresponding digital-to-analog component 268 (e.g., a DAC). The circuit 266 in FIG. 2D is similar to the circuit 250 in FIG. 2C with an additional output from the feedback component 234. The feedback component 234 in FIG. 2D includes a first output coupled to the digital-to-analog component 236 and a second output coupled to the digital-to-analog component 268. The output of the digital-to-analog component 268 is coupled to a driver component 270 and the output of the driver component 270 is coupled to an output 272 (e.g., a right leg drive output).

In accordance with some embodiments, the second output can be considered to drive the potential of the human body through an analog signal produced by the digital-to-analog component 268 (e.g., a DAC) from the available digital signals inside the feedback component 234 (e.g., an adaptation engine). This arrangement can form a global feedback loop through the human body to compensate for the induced noise on the body.

Figure 2E:
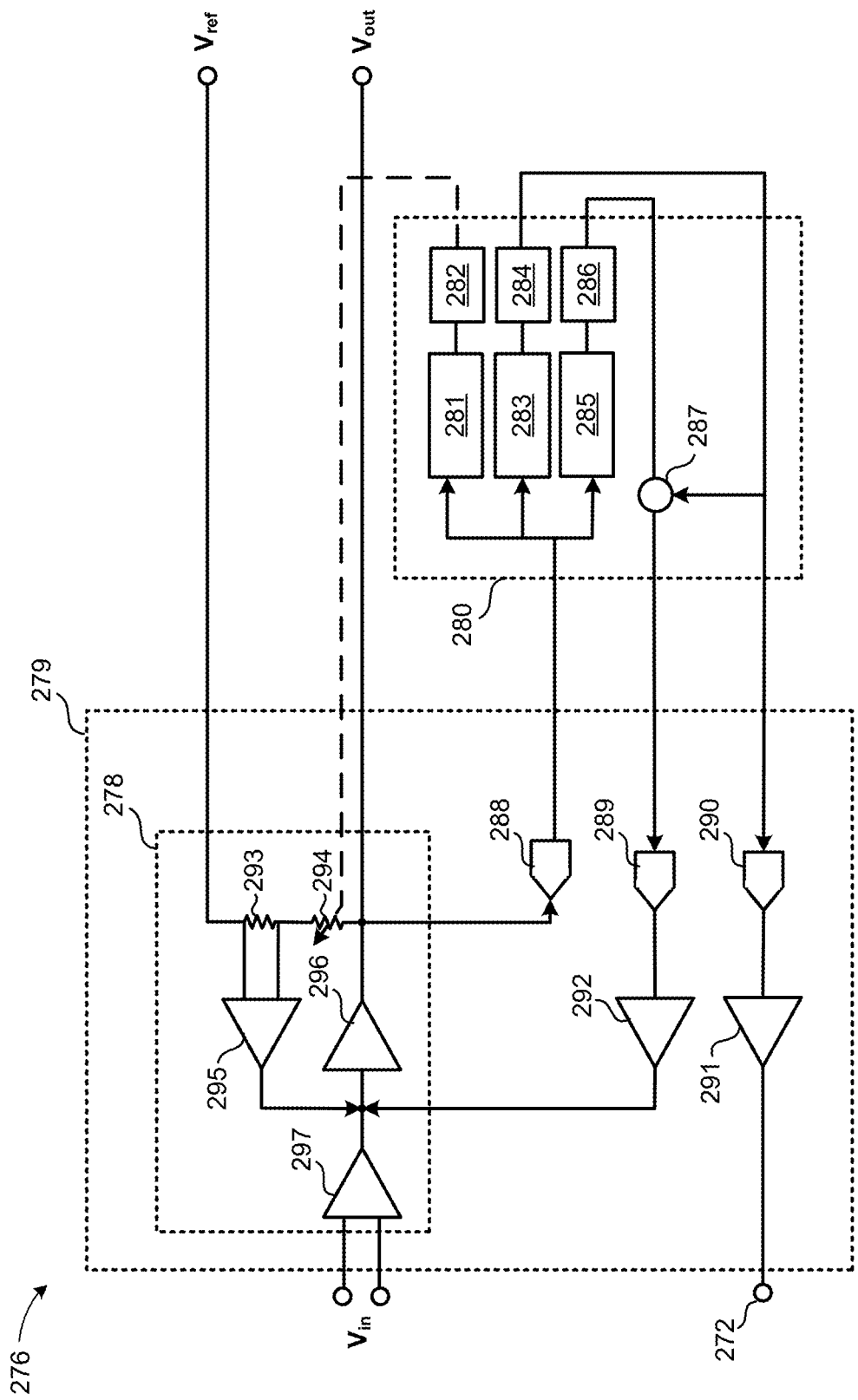
FIGS. 2E-2F show example circuits with digital adaptation components in accordance with some embodiments.

A more detailed example is shown in FIG. 2E with some components of a compensation component shown in accordance with some embodiments. FIG. 2E shows a circuit 276 that includes a compensation component 280 and an amplifier component 279. The compensation component 280 includes an amplitude detection component 281, a gain control component 282, a power-line-induced (PLI) noise component 283, a PLI compensation component 284, a baseline extraction component 285, a baseline compensation component 286, and a combiner component 287. In some embodiments, the PLI noise component 283 extracts noise at one or more preset frequencies (e.g., 50 Hz and/or 60 Hz). The amplifier component 279 includes a current feedback component 278, an analog-to-digital component 288, digital-to-analog components 289 and 290, and drivers 291 and 292. In some embodiments, the driver 291 and/or the driver 292 is an amplifier or buffer. The current feedback component 278 includes a resistor 293, a variable resistor 294, transconductors 295 and 297, and a driver 296. In some embodiments, the amplifier component 279 includes different components than are shown in FIG. 2E (e.g., in addition to, or alternatively to, the components shown in FIG. 2E). The output of the driver 291 is connected to an output 272 (e.g., an output for right leg drive).

The components of the compensation component 280 (e.g., a digital adaptation engine) are configured to detect amplitude, power-line-induced noise, and baseline extraction mechanisms as well as compensation loops for gain, PLI noise, and baseline wander. In accordance with some embodiments, the analog-to-digital component 288 in FIG. 2E is a dedicated low-resolution ADC.

Figure 2F:
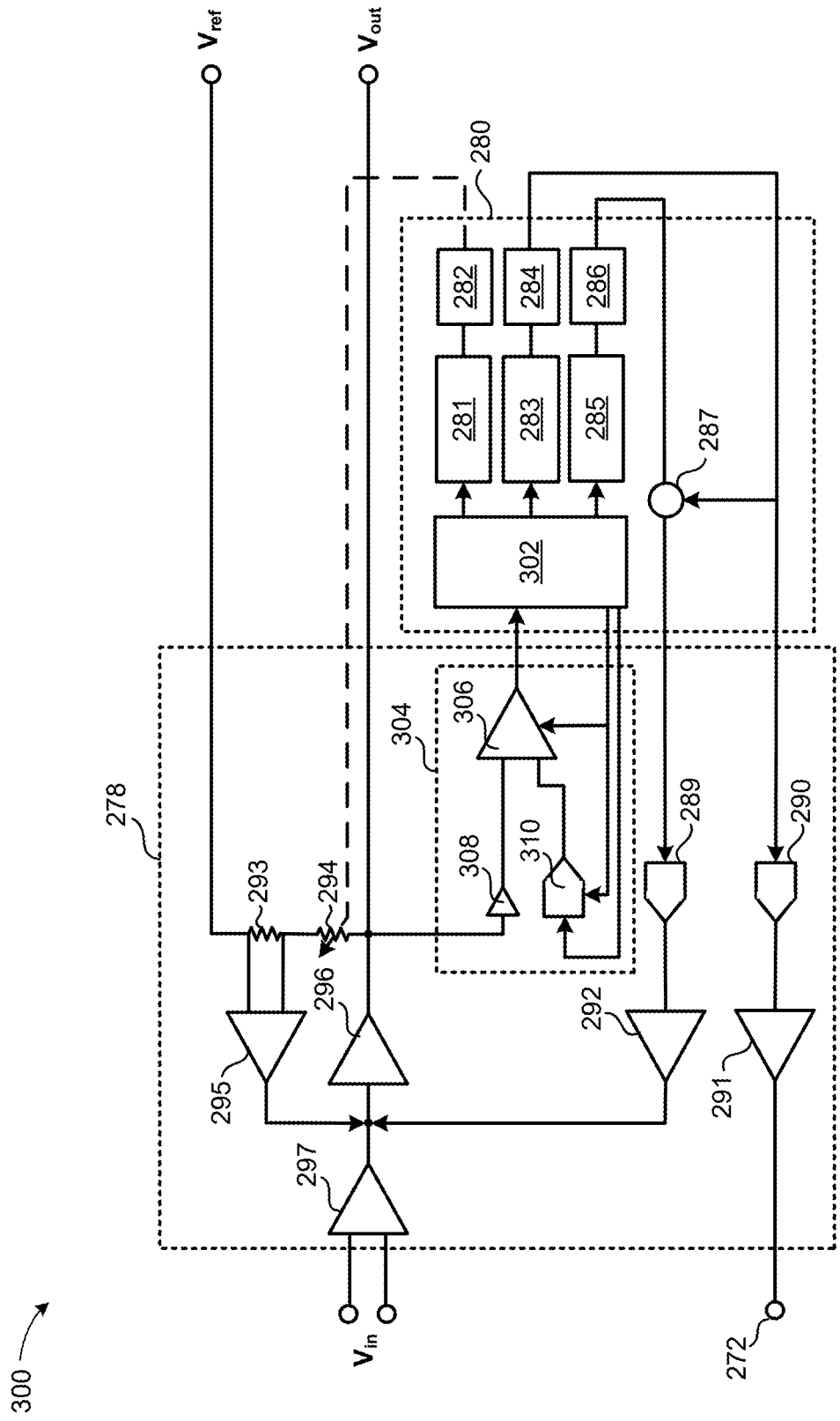

FIG. 2F shows a variant of the circuitry shown in FIG. 2E, where a tracking component 304 (e.g., a low-complexity hardware (HW) tracking component) replaces the analog-to-digital component 288 in FIG. 2E. For example, the tracking component 304 may be composed of a single-bit comparator (sign comparator) and a dedicated DAC that defines its reference voltage are controlled by a dedicated digital tracking algorithm.

The circuit 300 in FIG. 2F includes the amplifier component 279 and the compensation component 280 in accordance with some embodiments. The amplifier component 279 includes the tracking component 304. The tracking component 304 includes a driver 308 (e.g., a buffer), a comparator 306, and a digital-to-analog component 310. The comparator 306 may output a single bit to the compensation component 280. In particular the comparator 306 is coupled to a tracking component 302 (e.g., implementing a tracking algorithm). In accordance with some embodiments, the tracking component 302 outputs a clock signal to the comparator 306 and the digital-to-analog component 310. In accordance with some embodiments, the tracking component 302 outputs a digital output signal to the digital-to-analog component 310.

For example, FIG. 2F shows a variation of the circuitry shown in FIG. 2D. In some embodiments, the tracking algorithm in the tracking component 302 has mechanisms to statistically estimate the aggressors from the single-bit stream generated by the comparator 306 at a sample rate defined by a clock fs_CLK. For example, the tracking component 302 operates by controlling the DAC digital input code D_track such that it locks to the desired aggressor of interest.

In some embodiments, the circuitry shown in FIGS. 1A-1B and FIGS. 2A-2F is implemented a wearable device (e.g., the wrist-wearable device 6000 and/or the device 9000). In some embodiments, the circuitry shown and described above is implemented in any of the biopotential sensing devices described herein (e.g., to reduce noise and/or saturation).

In some situations, avoiding the use of a high-fidelity analog frontend and analog-to-digital converter (ADC) for the purpose of wake-up detection reduces power consumption. In some embodiments, correlators and variable template matching are utilized to pre-process EMG signals (e.g., for wake-up and/or gesture detection). In some embodiments, the pre-processing is incorporated into an analog frontend. Such methods, with various tuning and feedback mechanisms, also enable (e.g., limited) gesture detection without requiring machine learning (ML) models (e.g., that run in a remote processor/accelerator).

Figure 3A:
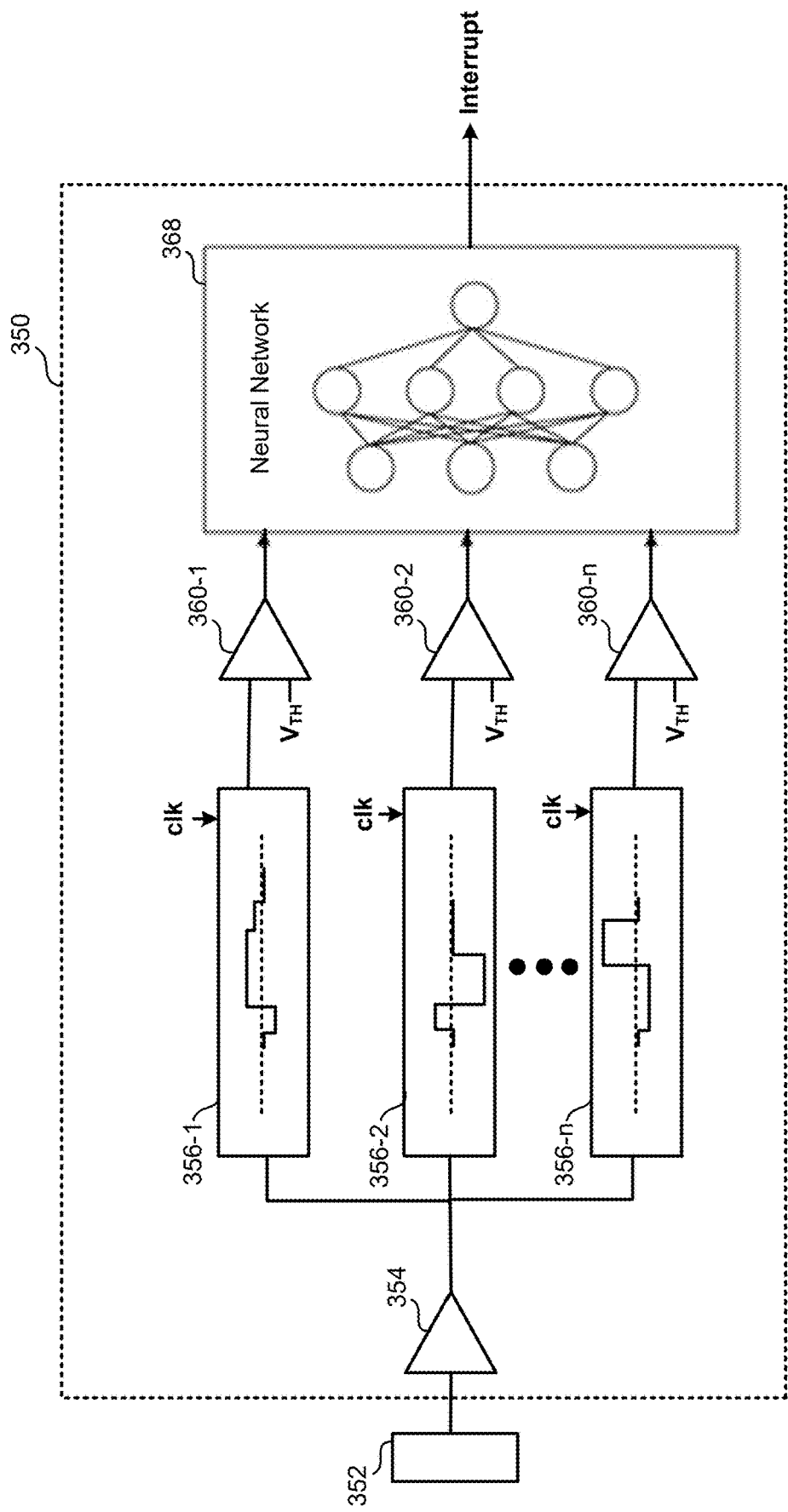
FIG. 3A shows an example circuit with analog correlators and a neural network in accordance with some embodiments.

FIG. 3A shows a simplified view of an apparatus where a bank of programmable analog correlators store programmable templates (e.g., equivalent to filter impulse responses). FIG. 3A shows a circuit 350 coupled to an electrode 352. The circuit 350 includes a driver 354 (e.g., an amplifier) coupled to a plurality of correlators 356 (e.g., 1-dimensional analog correlators). In some embodiments, the plurality of correlators 356 are programmable analog correlators. In some embodiments, the circuit 350 includes more or less correlators than are shown in FIG. 3A. The plurality of correlators 356 are coupled to a plurality of comparators 360. In accordance with some embodiments, each comparator is coupled to a threshold voltage ($V_{TH}$) to compare the output of the corresponding correlator with the threshold voltage. The output of the plurality of correlators 356 are coupled to a neural network 368 and the neural network 368 is configured to generate an interrupt signal. In some embodiments, the plurality of correlators 356 and the plurality of comparators 360 function as an input layer for the neural network 368. In some embodiments, each correlator of the plurality of correlators 356 includes a programmable impulse response quantized in amplitude and time (as indicated by the waveform within each correlator 356 in FIG. 3A).

An analog correlator can be considered as the equivalent of a 1-D correlator, operating in charge, voltage, or current domain. In some embodiments, the incoming time-series analog signal is passed certain (e.g., coarsely) quantized weights (e.g., binary) at a given sample rate (e.g., quantized in time). For example, per shift operation, a multiply and add operation occurs in analog domain producing a new sample. The net result is a cross-correlation operation as if the analog correlator is searching for the programmed template in the incoming analog time series. Once there is close enough matching, the output peaks and the peak can be detected by a single bit comparator that produces a digital bit. For example, a bank of analog 1-D correlators with programmable impulse responses combined with thresholded comparators create a first layer of the neural network 368.

For given functions, such as wake-up, a limited set of templates is sufficient in some situations and embodiments. The set of templates are optionally derived from training or generated manually. In some embodiments, the weights are programmed into each channel of the correlator bank digitally (e.g., as sequence of 1's and 0's for the case of binary weights). In some embodiments, the weights are updatable (e.g., on the fly) or hardcoded. The output of the bank of correlators can be seen as outputs of the input layer of a neural network (e.g., forming activation signals a0 to aN to the next layer which is in the digital domain).

Figure 4A:
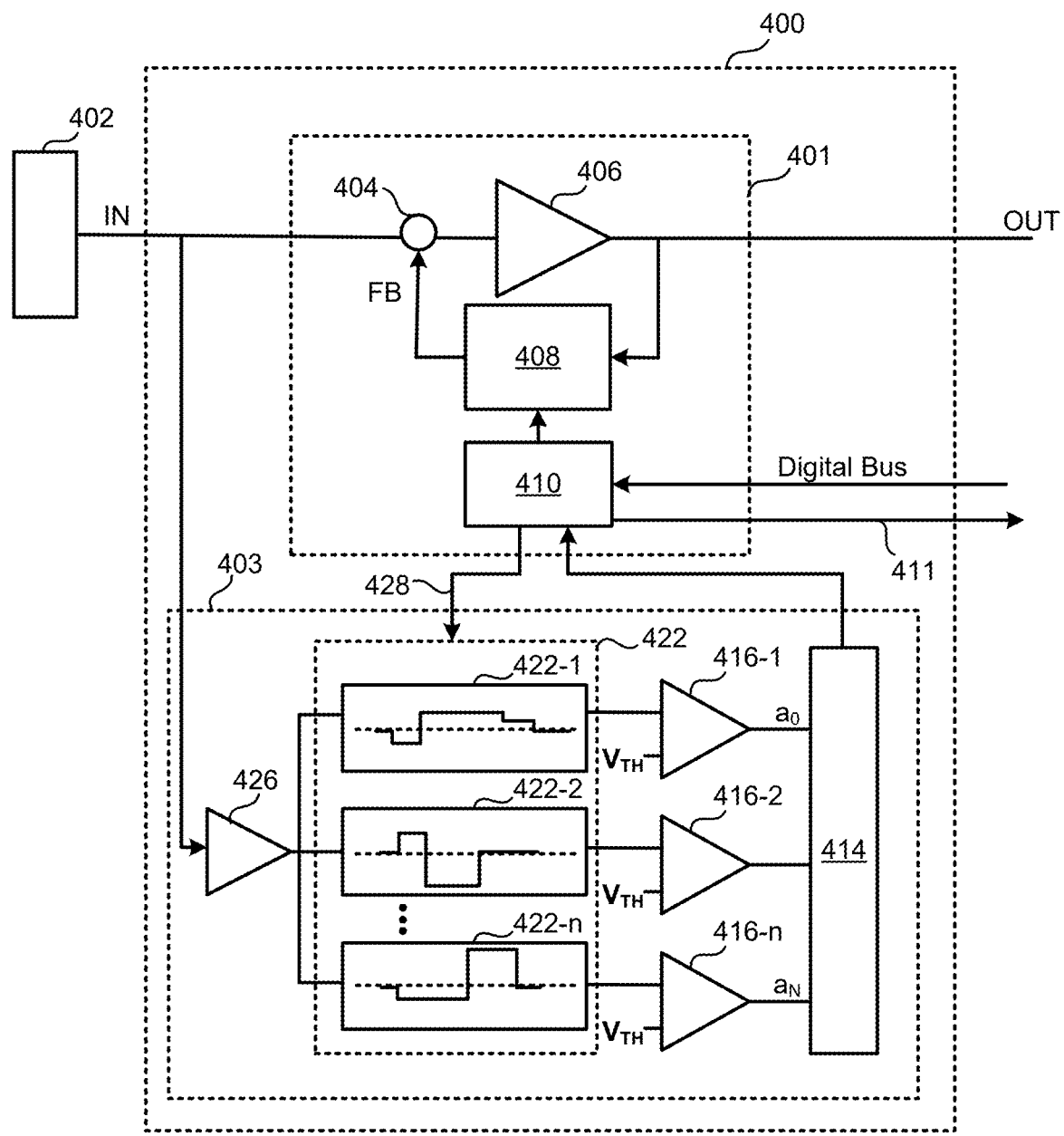
FIGS. 4A-4B show example frontends with analog correlators in accordance with some embodiments.

In contrast to a fully digital neural network used for wake-up detection, this approach eliminates the need for the analog frontend and data converters that digitize the biopotential signals before they can be fed to such digital neural networks. The power consumption associated with the operation of the high-fidelity analog frontend and ADC can therefore be eliminated. FIG. 4A shows an example of how such a wake-up function can be co-integrated with a high fidelity biopotential acquisition signal path.

Figure 3B:
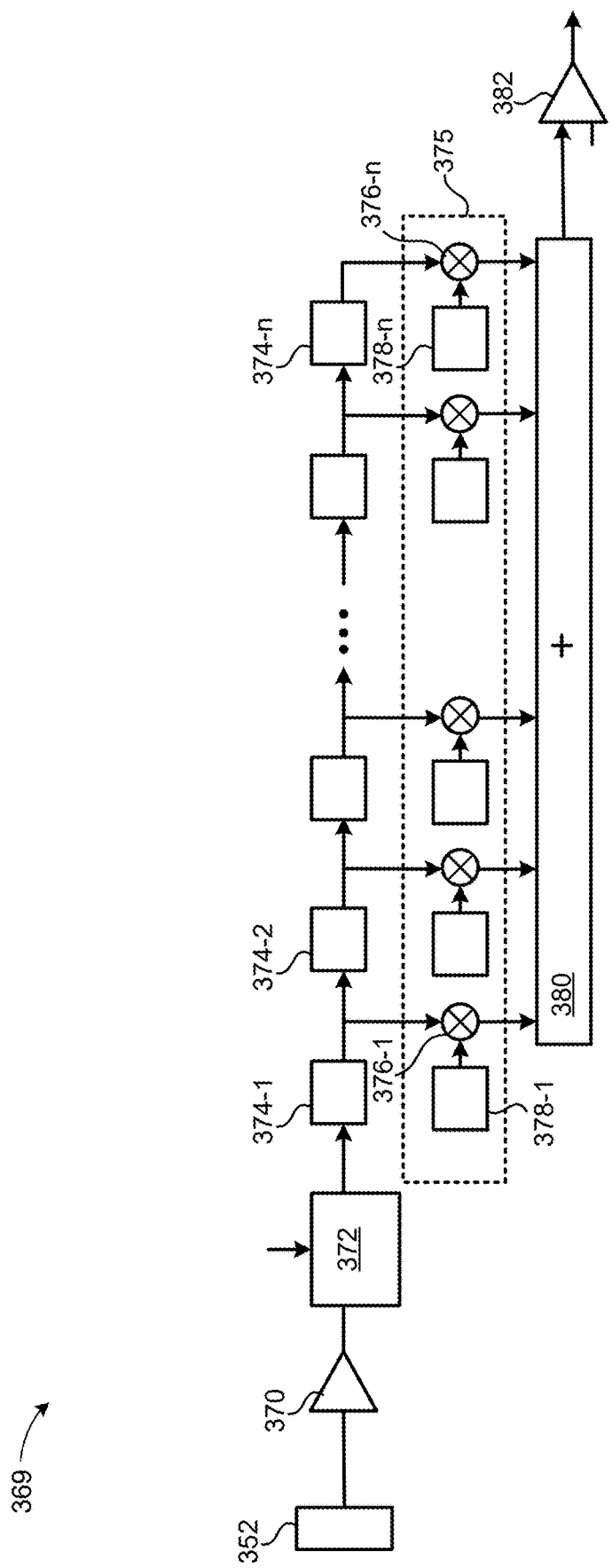
FIG. 3B shows an example correlation circuit in accordance with some embodiments.

FIG. 3B shows a correlation circuit 369 in accordance with some embodiments.

The circuit 369 shows the electrode 352 coupled to an amplifier 370. The amplifier 370 is coupled to an envelope calculator 372 (e.g., an RMS envelope calculator where fs=1/Ts). The output of the envelope calculator 372 is coupled to a plurality of delay elements 374 (delay element 374-1 through 374-n). In some embodiments, each delay element has a corresponding delay of Ts. The plurality of delay elements 374 are coupled to a template component 375. The template component 375 includes a plurality of weight functions 378 (weight function 378-1 through weight function 378-n) and a plurality of multipliers 376 (multiplier 376-1 through 376-n). The template component 375 is coupled to a summation component 380. The summation component 380 is coupled to a comparator 382 with a second input ($V_{TH}$). The output of the comparator 382 indicates a correlation peak detection. The circuit 369 is an example of an analog 1-D template detection correlator with high-level functional blocks and a correlation threshold detector (e.g., a biopotential signal envelope template detection signal path).

The envelope calculator 372 may be an RMS envelope detector that includes a boxcar sampler realizing a windowed track and an integrate function that integrates the signal energy for the duration of a defined time stamp, Ts, in a continuous manner. The output of the envelope calculator 372 enters a delay line (e.g., the delay elements 374) with quantized delays equal to the same window duration, Ts. The output of each delay element 374 is multiplied by a weight (e.g., $A_0$ to $A_N$) that corresponds to a quantized level of a fitted template to the envelope of the biopotential signal. The number of delay elements and weight functions together with Ts determine a quantization in time for the assigned template to the signature of the biopotential signal. The number of levels (corresponding to 'n') for fitting the weight functions ($A_0$ to $A_N$) to the continuous time and analog amplitude envelope determines the quantization levels in amplitude.

Figure 3C:
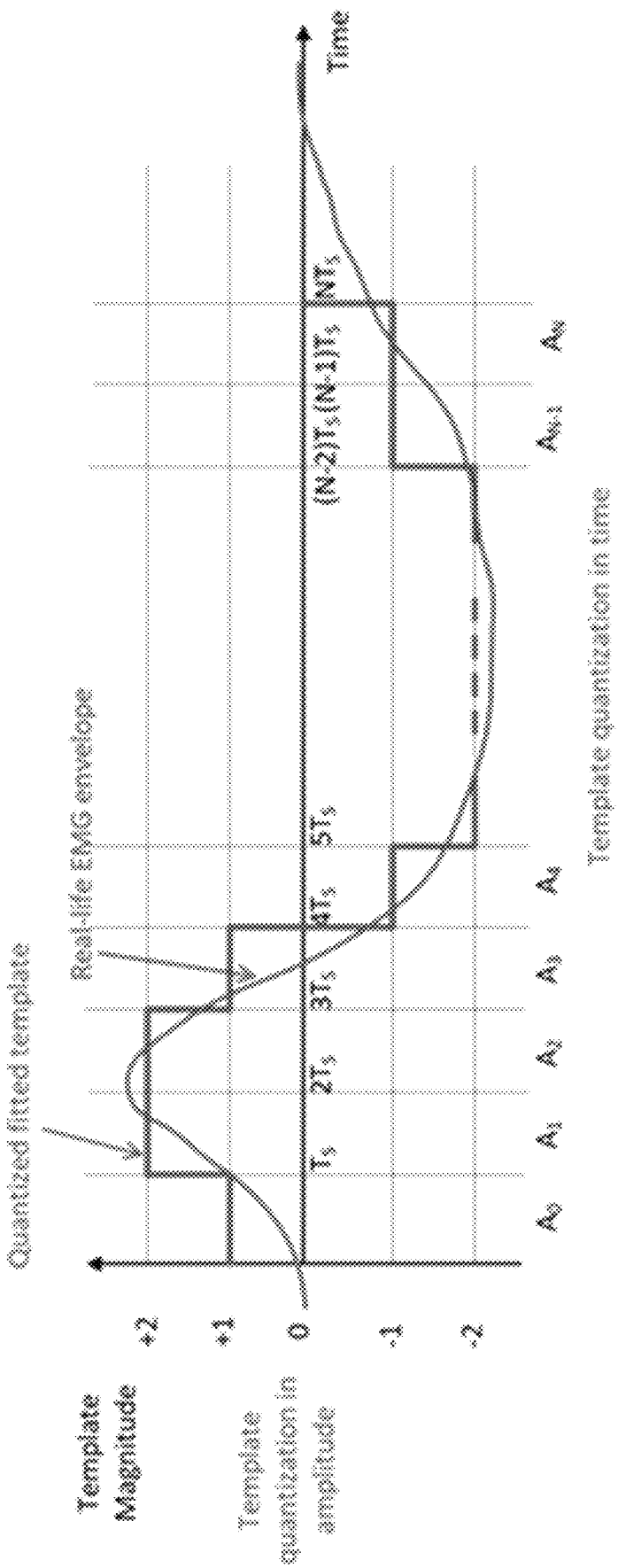
FIG. 3C shows an example envelope template in accordance with some embodiments.

FIG. 3C shows an example envelope template in accordance with some embodiments. The graph in FIG. 3C illustrates a continuous time biopotential signal envelope signature fitted with an envelope template that is quantized in time and in amplitude. In the example of FIG. 3B, each of the 1-D correlator signal paths feeds the multiplication results of each delay path to a summation point whose output is monitored by a threshold comparator. A matching between the envelope of the incoming biopotential signal with the programmed quantized template through the weights ($A_0$ to $A_N$) results in a correlation peak detected by the comparator, which then produces an activation bit at the output of the correlator channel. The signal path in FIG. 3B can be implemented with analog circuit components directly extracting features from the analog signals produced by a biopotential sensing electrode. For example, the functions can be assumed to be realizing the multiply and add functions in charge domain by means of resistors, capacitors as well as switches or current sources.

Figure 3D:
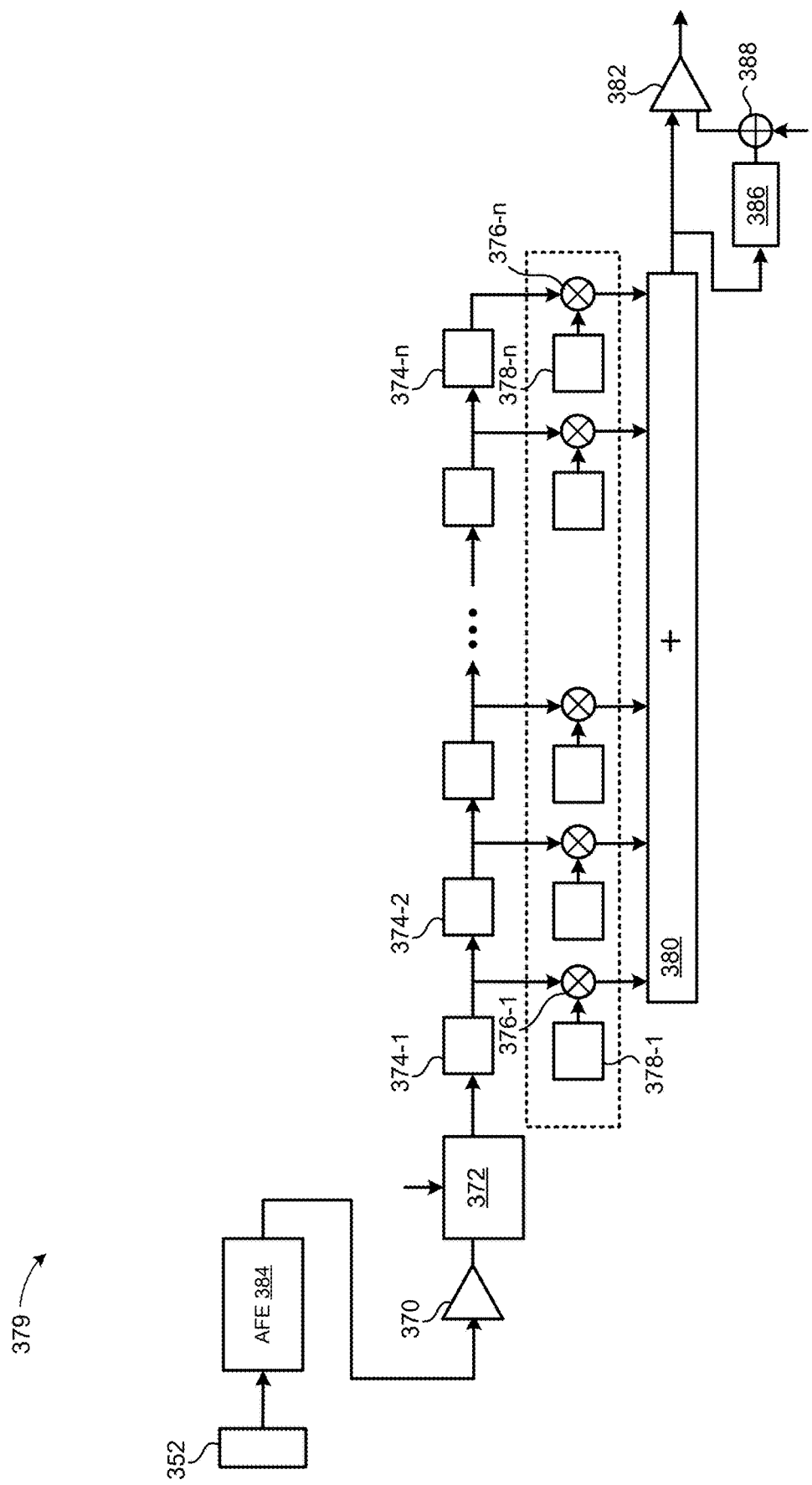
FIG. 3D shows an example correlation circuit in accordance with some embodiments.

FIG. 3D shows a correlation circuit 379 in accordance with some embodiments. The correlation circuit 379 can be considered as a digital equivalent of the analog correlation circuit 369 in FIG. 3B. The correlation circuit 379 is the same as the correlation circuit 369 with the addition of an analog frontend component 384 (e.g., including an amplifier subcomponent and/or an ADC subcomponent), an adaptive threshold component 386, and a summation component 388. The summation component 388 takes as inputs, the output of the adaptive threshold component 386 and a fixed threshold input. In some embodiments, the amplifier 370 is a gain component in the circuit 379. The digital signal path in FIG. 3D can be implemented with digital circuits as a backend processing component. The same functions realizing delays and weights can be implemented by means of digital registers, multipliers and adders with digital adaptive thresholding for detection of correlation peak for template detection. The digital signal path can be fed with the raw digital biopotential signals produced by the AFE 384 comprising an amplifier and an analog-to-digital converter.

FIG. 4A shows a circuit 400 coupled to an electrode 402 in accordance with some embodiments. The circuit 400 includes an amplifier component 401 and an analysis component 403. The amplifier component 401 includes a combiner component 404, an amplifier 406, a feedback component 408 (e.g., implementing an adaptive algorithm), and a digital interface 410. The digital interface 410 receives digital signals via the digital bus and outputs an interrupt (wake-up) signal 411 and a wake-up function signal 428. The analysis component 403 includes correlators 422 (including correlators 422-1 through 422-*n*), a driver 426 (e.g., an amplifier), comparators 416, and a register 414.

For example, during a low power mode, the high-fidelity signal path is powered off (e.g., disabled or shut down) to save power while a lower power wake-up function searches for the programmed templates in the signals acquired by the electrode. In some embodiments, the rest of the neural network is implemented in a different location in the system, e.g., in a host processor that receives an interrupt and collects the digital output of the correlator banks (e.g., the signals a0 to aN). For example, these can be fetched by the remote accelerator when the interrupt is received. The circuit 400 can be interpreted as a biopotential frontend amplifier with a first layer of neural network directly implemented in it. For example, an adaptive frontend that includes an analog 1-D correlator bank as the input layer of a neural network for wake-up detection and/or simple feature extraction.

Figure 4B:
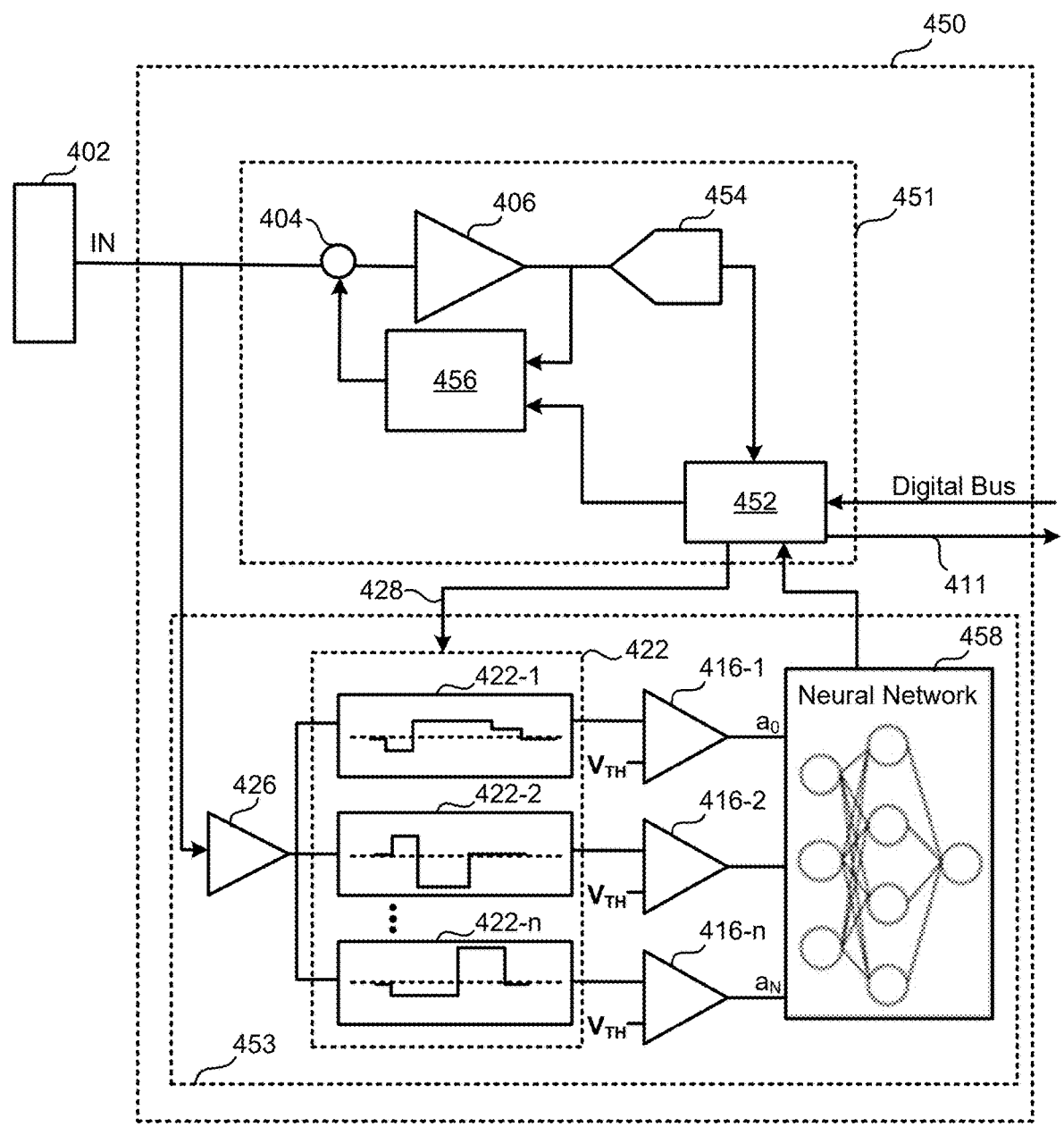

FIG. 4B shows a circuit 450 coupled to the electrode 402 in accordance with some embodiments. The circuit 450 includes an amplifier component 451 and an analysis component 453. The amplifier component 451 in FIG. 4B includes the combiner component 404, the amplifier 406, an analog-to-digital component 454, a feedback component 456 (e.g., implementing an adaptive algorithm), and a digital interface 452. The analysis component 453 includes the driver 426, the plurality of correlators 422, the comparators 416, and a neural network 458.

In accordance with some embodiments, FIG. 4B shows a more complete frontend example with a data converter (e.g., ADC) to the amplifier 406. In some embodiments, the frontend example in FIG. 4B includes a backend digital neural network 458 for wake-up detection. In some embodiments, the backend digital neural network 458 is at a remote (host) microcontroller and/or accelerator.

In some embodiments, EMG functionality is physically partitioned across several integrated circuits (ICs). In some embodiments, the system includes a smaller and/or simpler circuit (e.g., IC) at the electrode that is controlled by an ASIC. In some embodiments, the ASIC configures the peripheral electrode circuit to change functionality and calibrate as necessary to the end user.

Figure 5A:
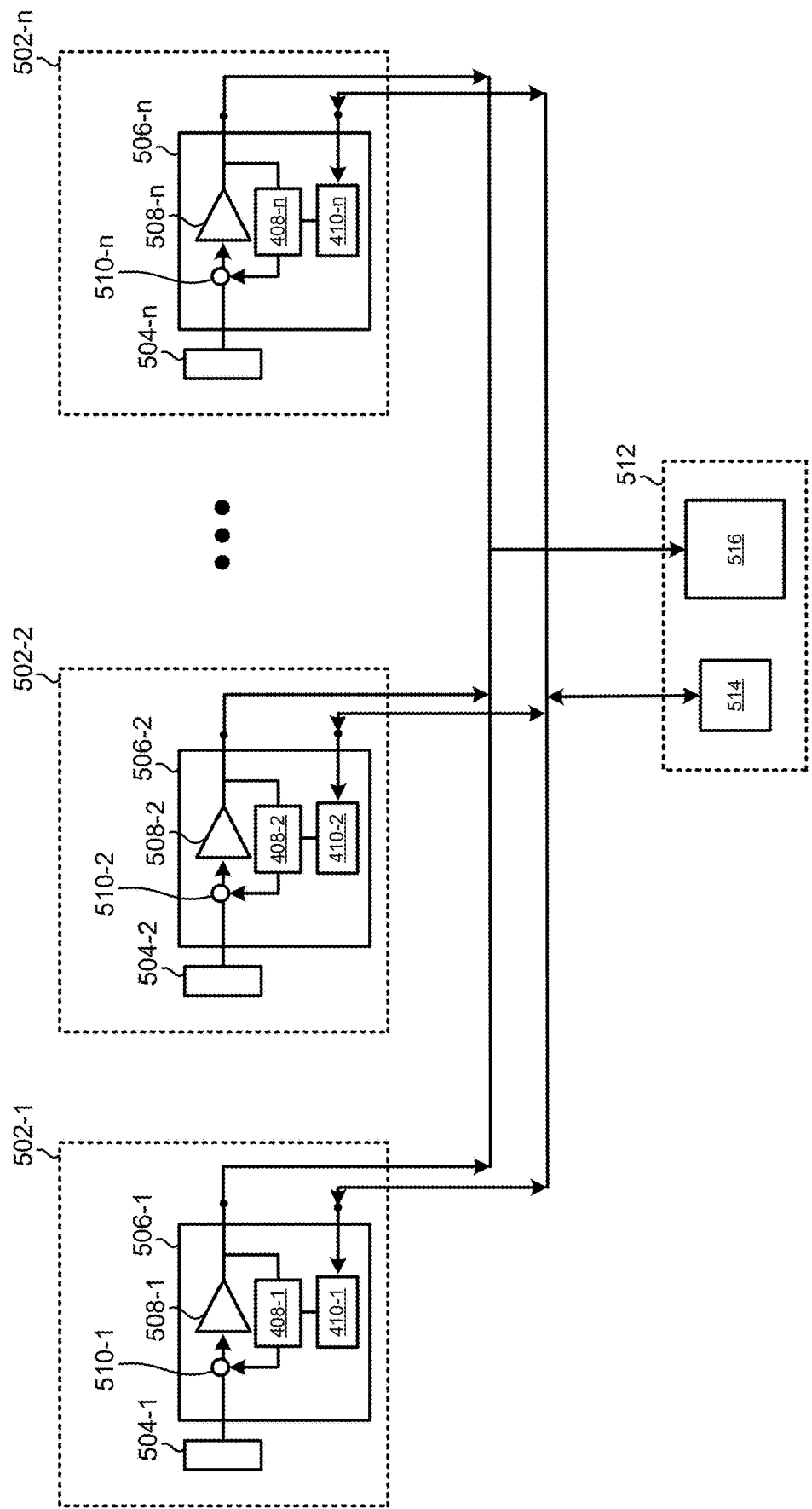
FIGS. 5A-5E show example multi-channel systems with adaptive frontends in accordance with some embodiments.

FIG. 5A shows a plurality of channels 502 coupled to a processing component 512. Each channel 502 includes an electrode 504 coupled to a frontend component 506. Each frontend component 506 includes a combiner component 510, an amplifier 508, a feedback component 408, and a digital interface 410. The digital interfaces 410 in FIG. 5A are communicatively coupled to a digital interface 514 of the processing component 512. The outputs of the amplifiers 508 are communicatively coupled to a processing element 516 of the processing component 512. In some embodiments, the processing element 516 includes an ADC and/or an amplifier.

A partitioning example for a multi-channel biopotential-acquisition system is shown in FIG. 5A where samples of the adaptive frontend chip are integrated with the biopotential electrodes and a number of them are accessed through an analog bus and a digital control bus. In the example of FIG. 5A, the (e.g., central) processing component 512 integrates functions such as data conversion and digital processing. In this way, FIG. 5A shows an analog partitioning for a multi-channel system with adaptive analog frontend in accordance with some embodiments.

Figure 5B:
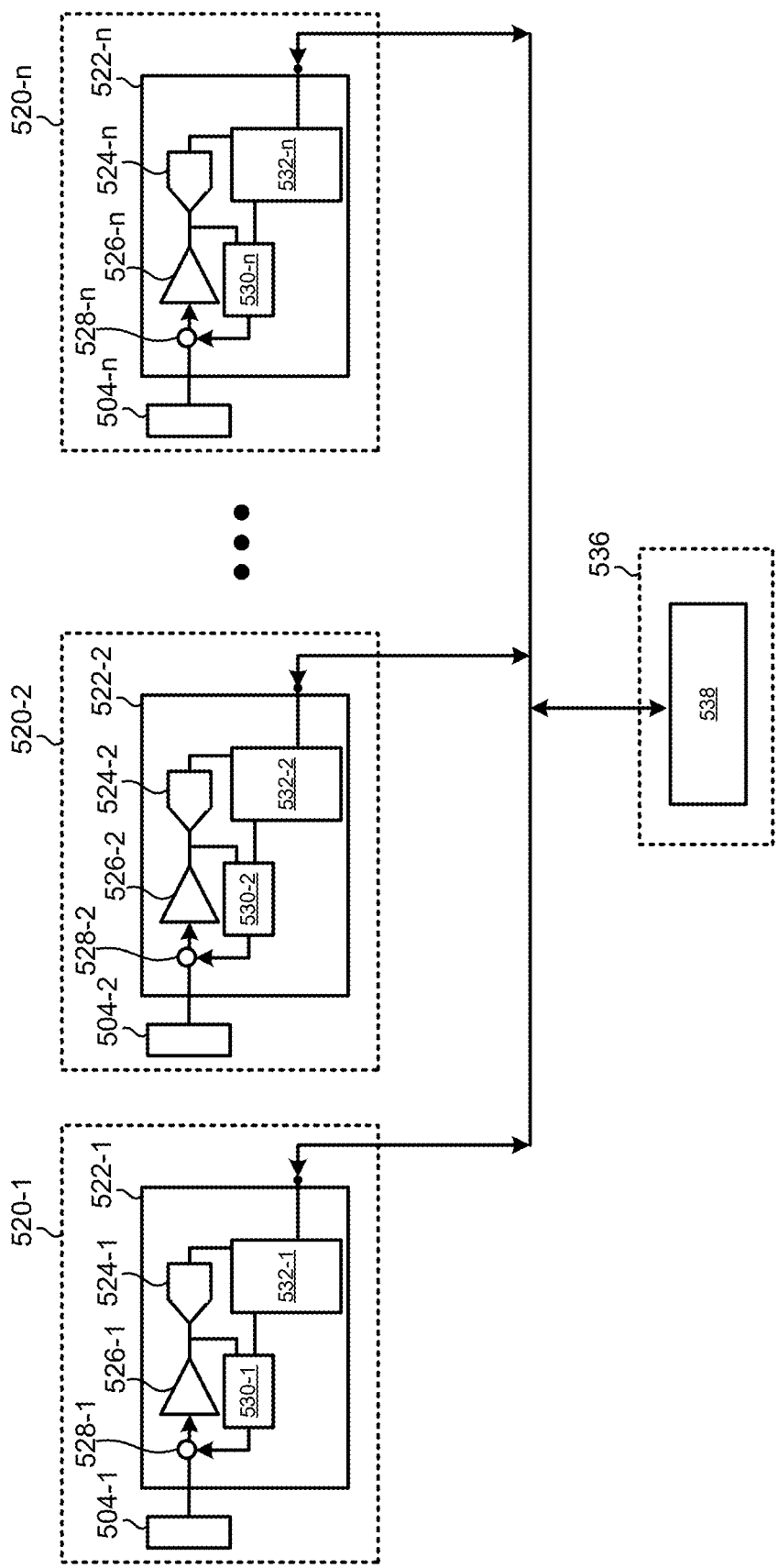

FIG. 5B shows a plurality of channels 520 coupled to a processing component 536. Each channel 520 includes an electrode 504 coupled to a frontend component 522. Each frontend component 522 includes a combiner component 528, an amplifier 526, an analog-to-digital component 524, a feedback component 530, and a digital interface 532. The digital interfaces 532 are coupled to the processing component 536 (e.g., via a digital bus line). The processing component 536 includes a digital interface and compute component 538.

Another variant of such multi-channel system is shown in FIG. 5B where data converters (e.g., ADCs) are also integrated together with the adaptive frontend and only a digital control and data bus is routed to the processing component 536 (e.g., a central processing unit) for extraction of the raw digitized electrode signals from each channel and programming those chips. In this way, FIG. 5B shows a digital partitioning for a multi-channel system with adaptive analog frontend and ADCs in accordance with some embodiments.

Figure 5C:
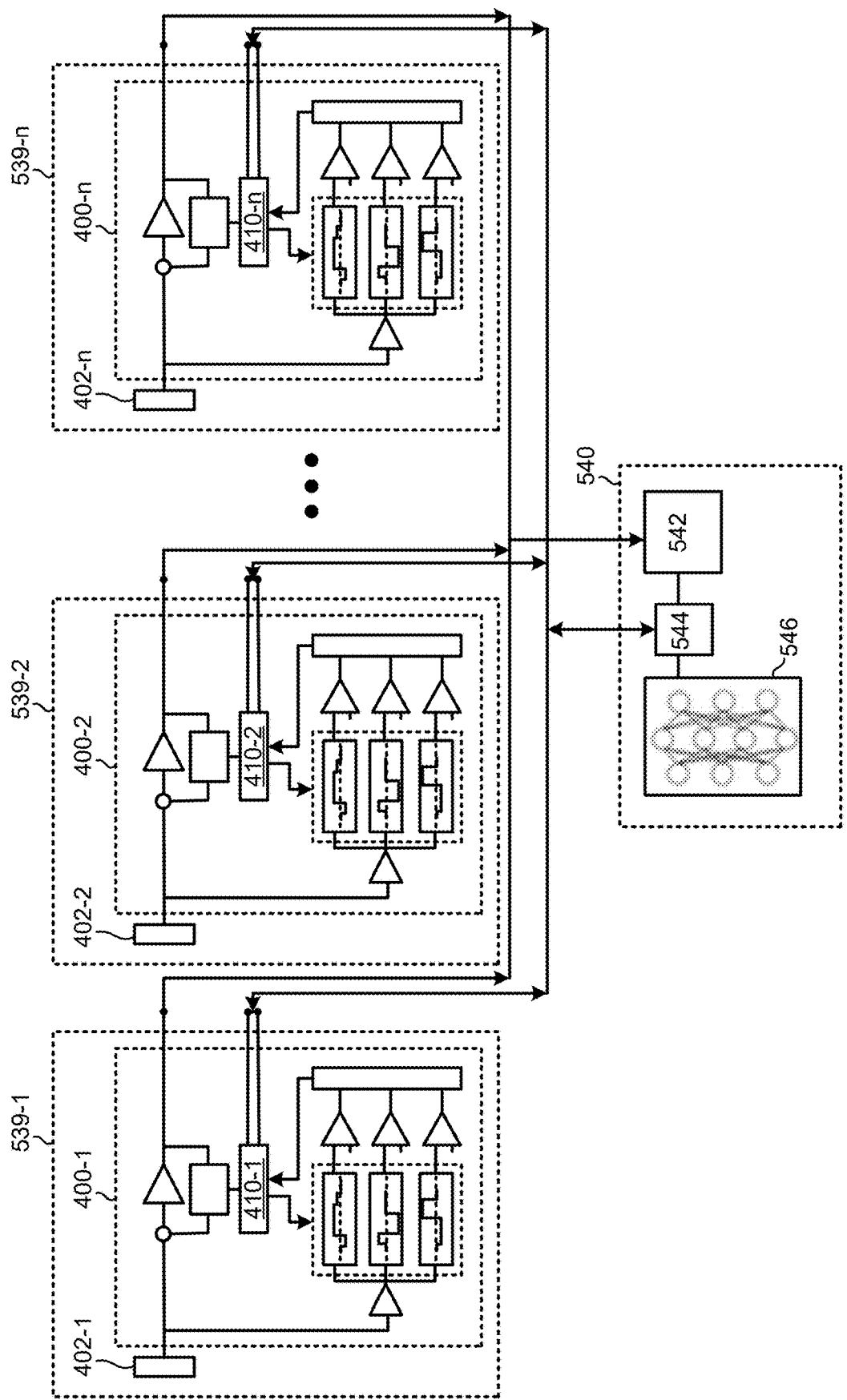

FIG. 5C shows a plurality of channels 539 coupled to a processing component 540 in accordance with some embodiments. Each channel 539 includes an electrode 402 coupled to a circuit 400 (e.g., as described above with respect to FIG. 4A). Each circuit 400 includes a digital interface 410 that is coupled via a digital bus to a digital interface 544 of the processing component 540. The output of each amplifier from each circuit 400 is coupled to a processing element 542 of the processing component 540. The processing component 540 includes the processing element 542, the digital interface 544, and a neural network 546. In some embodiments, the processing element 542 includes an analog-to-digital component and/or an amplifier.

Some partitioning embodiments include the analog 1-D correlator-based wake-up functions. FIG. 5C shows an implementation where frontend chips at the electrode side integrate the adaptive analog frontend and the analog input layer of the wake-up neural network (e.g., the rest of the wake-up scheme is in the processing component 540). In this way, the system in FIG. 5C includes analog partitioning with frontend adaptive chips that integrate the 1-D correlator bank input layer of the wake-up neural network.

Figure 5D:
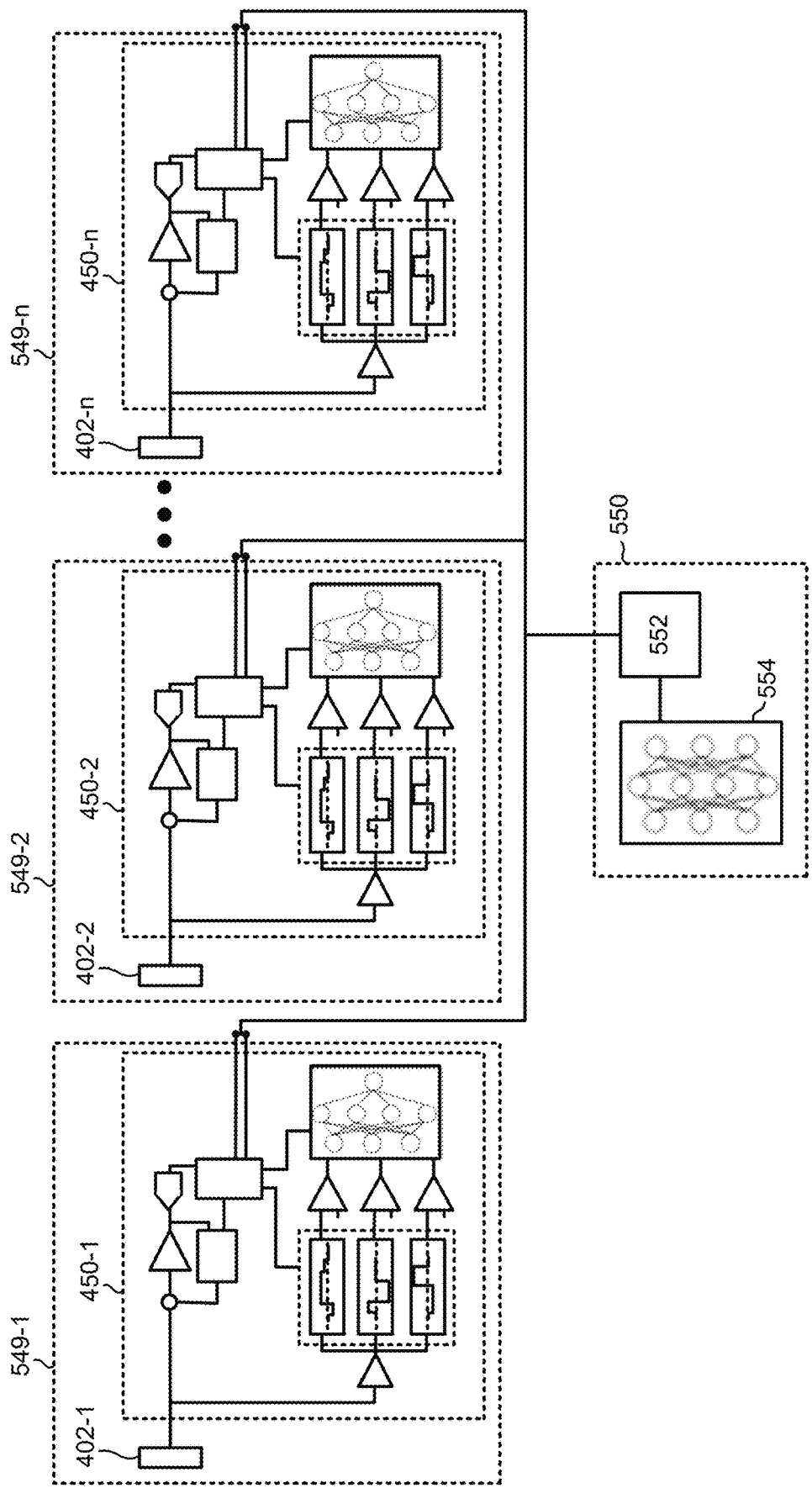

FIG. 5D shows a plurality of channels 549 coupled to a processing component 550 in accordance with some embodiments. Each channel 549 includes an electrode 402 coupled to a circuit 450 (e.g., as described above with respect to FIG. 4B). Each circuit 450 includes a digital interface that is coupled via a digital bus to a digital interface 552 of the processing component 550. The processing component 550 includes the digital interface 552 and a neural network 554.

FIG. 5D shows an implementation where the frontend chips integrate more function, e.g., ADC conversion after the adaptive analog frontend for digitization of the biopotential signal, as well as the digital backend of the wake-up neural network in addition to the analog correlator bank. In this way, the system in FIG. 5D includes digital partitioning based on the adaptive frontend with integrated ADC and wake-up neural network.

Figure 5E:
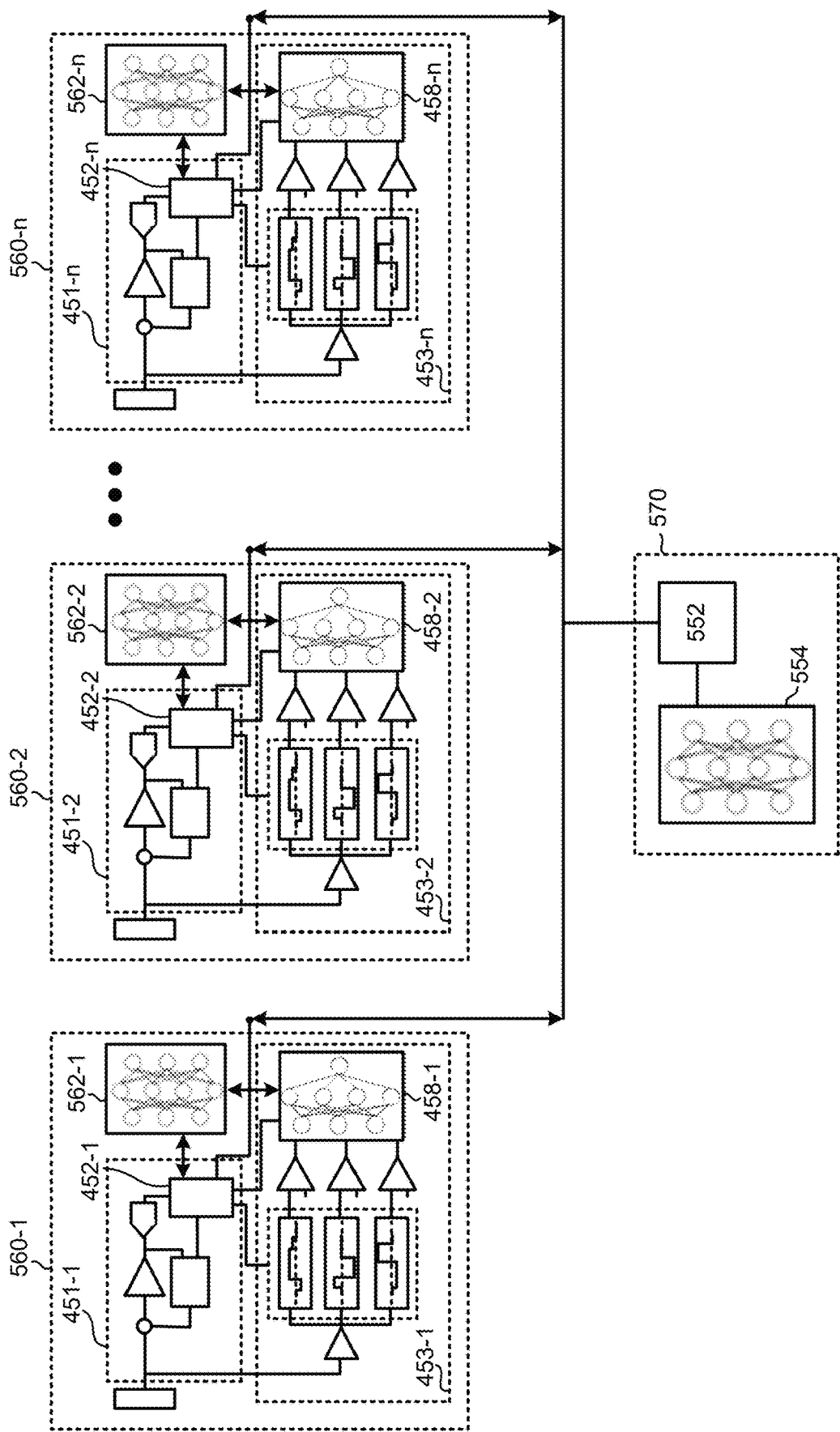

FIG. 5E shows a plurality of channels 560 coupled to a processing component 570 in accordance with some embodiments. Each channel 560 includes an electrode coupled to an amplifier component 451 and an analysis component 453 (e.g., as described above with respect to FIG. 4B). In the example of FIG. 5E, the amplifier component 451 is coupled to a neural network 562 that communicates with the neural network 458 of the analysis component 453. Each digital interface 452 is coupled to the digital interface 552 of the processing component 570. The processing component 570 includes the digital interface 552 and the neural network 554.

Another variant of this system partitioning is shown in FIG. 5E, where a (more advanced) neural network is also embedded in the adaptive frontend chips. In some embodiments, the addition of the neural networks 562 to the system is used for feature extraction from the biopotential signal directly at the electrode location in addition to the feature extractions for the wake-up detection. In some embodiments, at the system level, the neural network for feature extraction (such as gesture detection) are distributed across the local networks per electrode and the main neural network at the processing component 570. In this way, FIG. 5E shows system partitioning based on adaptive analog frontends, ADC, local neural networks for low power wake-up and feature extraction, and transferring metadata to the central processing unit for aggregation and final feature extraction.

In some embodiments, the communication between the channels and the processing component is through metadata, e.g., features extracted by the local networks, rather than through the raw biopotential signals sent over the data buses. The transfer of metadata rather than raw data has the potential benefit of power saving at the system level due to lower data communication traffic between the channels and the processing component. Furthermore, the overall feature extraction and the design of the system-level neural network can be partitioned based on any specific features expected from any of the specific channels, e.g., due to the physical location of those channels and the particular features that might be specific to each channel or a group of channels. In some embodiments, the interdependence between the features from different channels is accounted for by the central neural network (e.g., the neural network 554).

Some embodiments include impedance detection methods using an alternating current (AC) waveform generated by a controller ASIC that allow for impedance estimation through a peripheral ASIC. In some embodiments, the impedance detection includes compensation calculations that take into account the impact of the analog frontend to the measured signal. This is advantageous over conventional approaches that require an impedance demodulator circuit to have direct access to the electrode.

Some embodiments include hardware for injection of direct current (DC) and/or AC signals into the electrode as well as quadrature detection hardware (e.g., mixer, filters, and the like) for impedance measurement. In some embodiments, each path for injection or detection is enabled individually, e.g., each chip is able to simultaneously inject and detect (or the chip is configured for only injection or detection). In some embodiments, when placed in a multi-channel system as shown in FIG. 6, the detection signal is routed on the analog bus and detected by a central processing component.

Figure 6:
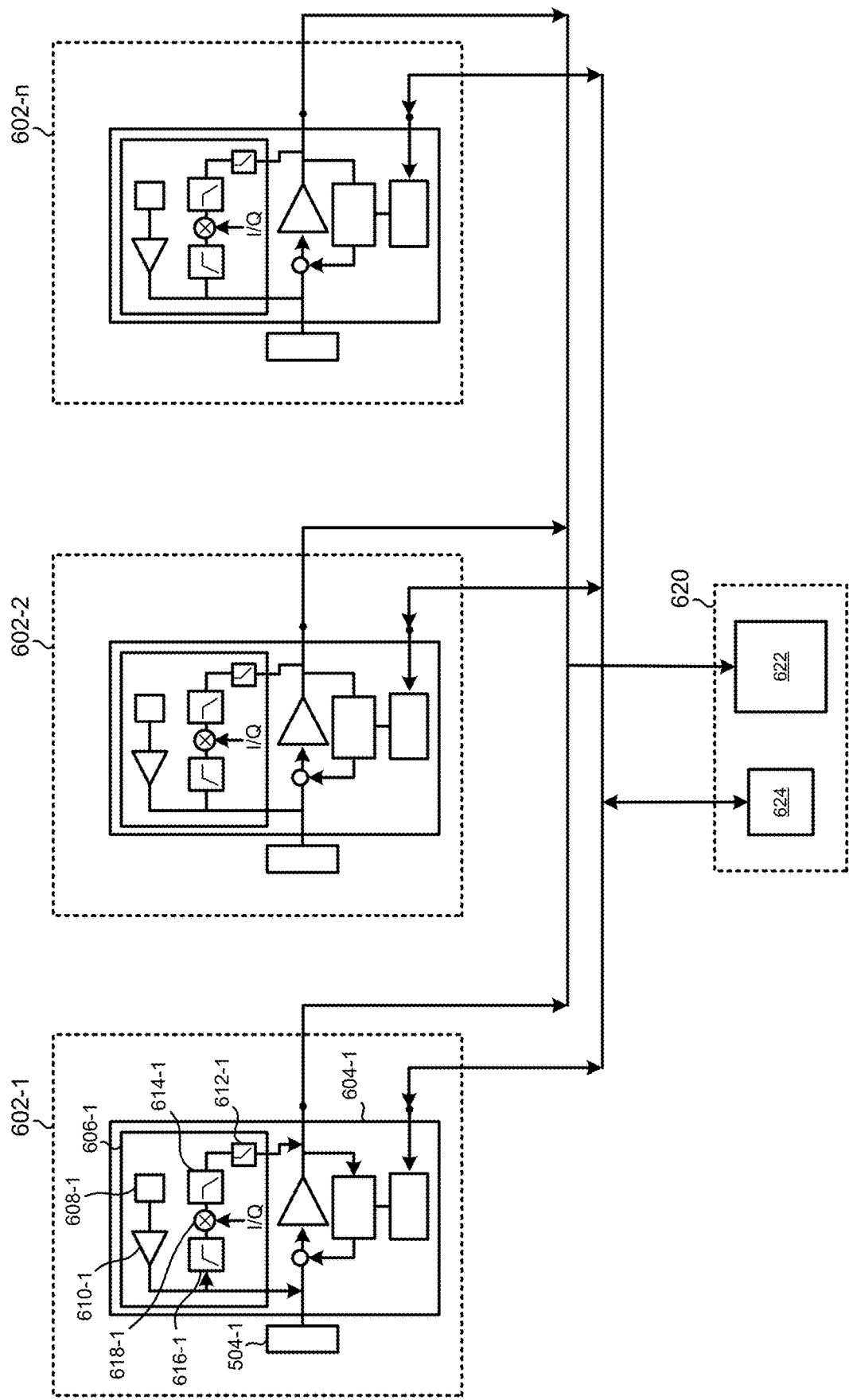
FIG. 6 shows an example multi-channel system in accordance with some embodiments.

FIG. 6 shows a plurality of channels 602 coupled to a processing component 620 in accordance with some embodiments. Each channel 602 includes an electrode 504 coupled to an adaptive frontend component 604. Each adaptive frontend component 604 includes an impedance component 606 in addition to an amplifier component (e.g., the frontend component 506 described previously with respect to FIG. 5A). Each impedance component 606 includes a current component 608, a driver component 610 (e.g., a buffer or amplifier), a high pass filter 616, a low pass filter 614, a switch 612, and a combiner component 618 (e.g., a summing element). In some embodiments, the impedance component is a programmable impedance measurement injection and detection component. The processing component 620 includes a processing element 622 coupled to outputs of the amplifiers and a digital interface 624 coupled to digital interfaces of each channel.

In some embodiments, the impedance detection includes injection and detection for impedance measurement through the same channel. In some embodiments, the impedance detection includes injection from any given channel and detection and impedance measurement from another channel. In some embodiments, the impedance detection includes calibration of the channels in a rotational basis, e.g., at power up or in a time-multiplexed fashion. In this way, FIG. 6 shows a multi-channel impedance measurement through injection and detection (e.g., self-injection and detection, or injection from any channel and detection through another channel). In some embodiments, the impedance detection described above is applicable to any one of the systems shown in FIGS. 5A-5E and described above.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU) s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device, in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

Artificial-reality systems may be implemented in a variety of different form factors and configurations. Some artificial-reality systems include a near-eye display (NED), which provides visibility into the real world (e.g., the augmented-reality system 7000 in FIG. 9A) or that visually immerses a user in an artificial reality (e.g., the virtual-reality system 7010 in FIG. 9B). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., the wearable device 6000 in FIG. 8A), devices worn by one or more other users, and/or any other suitable external system.

Figure 7A:
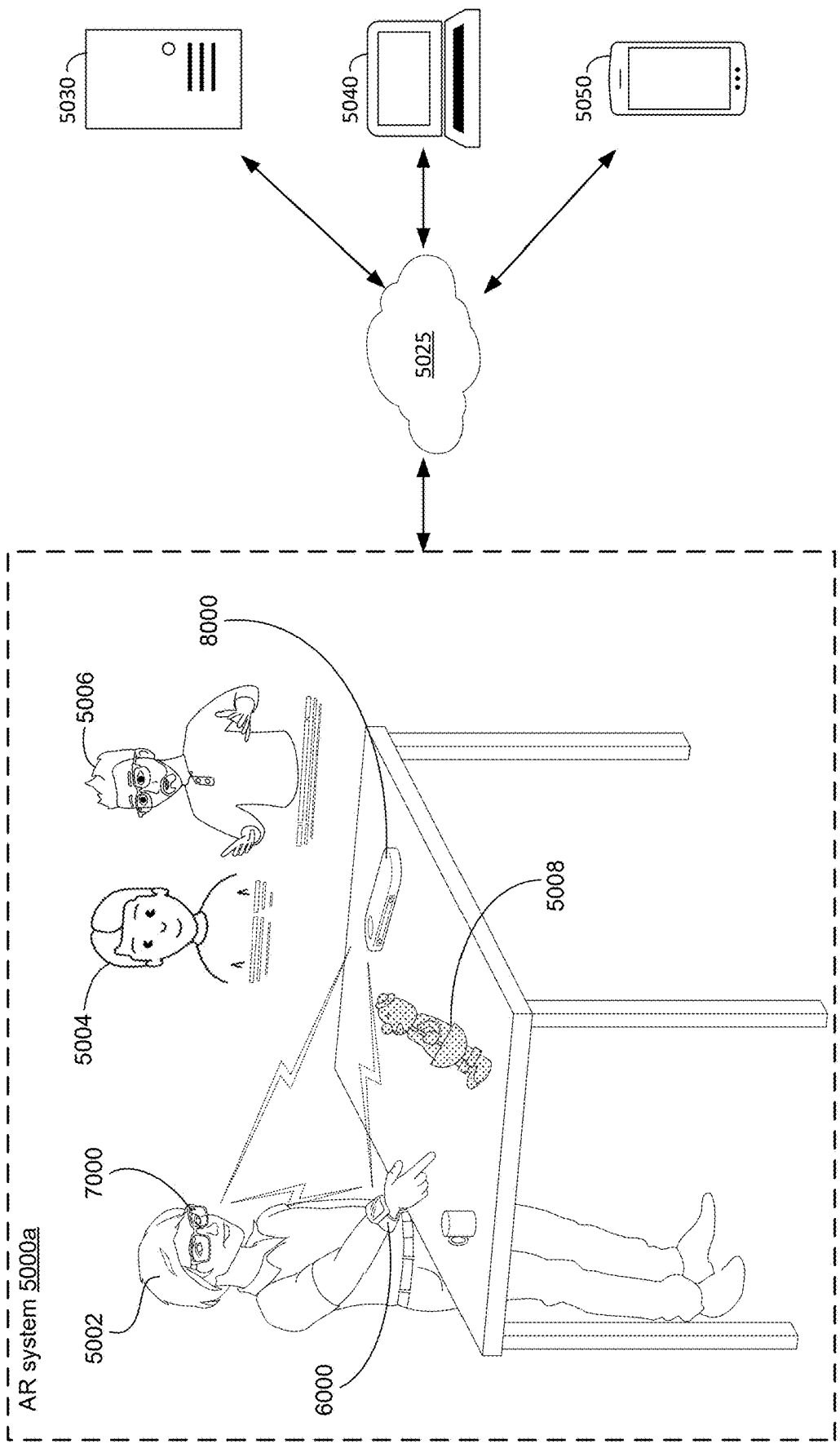
FIGS. 7A, 7B, 7C-1, 7C-2, 7D-1, and 7D-2 illustrate example AR systems in accordance with some embodiments.
Figure 7B:
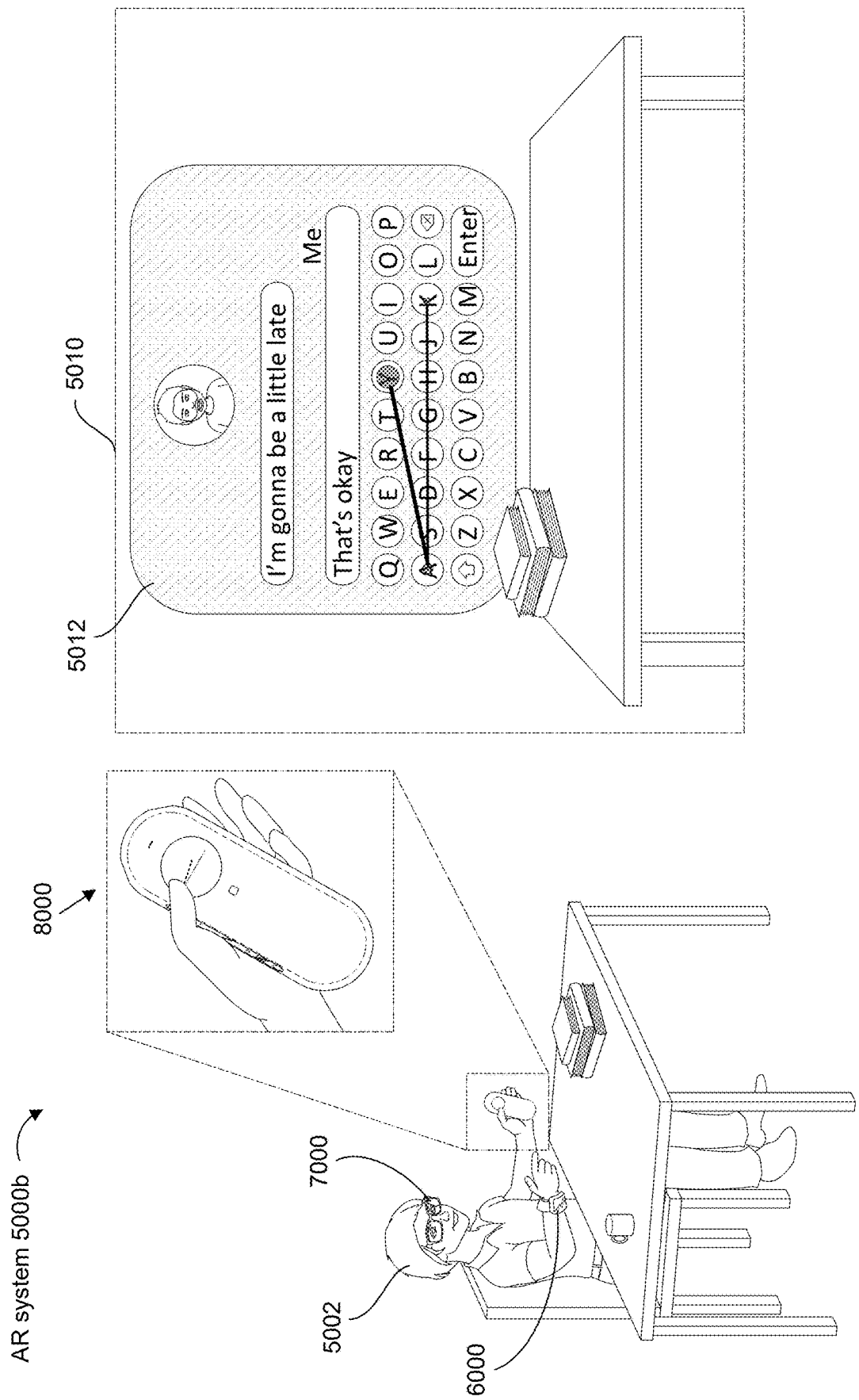
Figures 1, 7C:
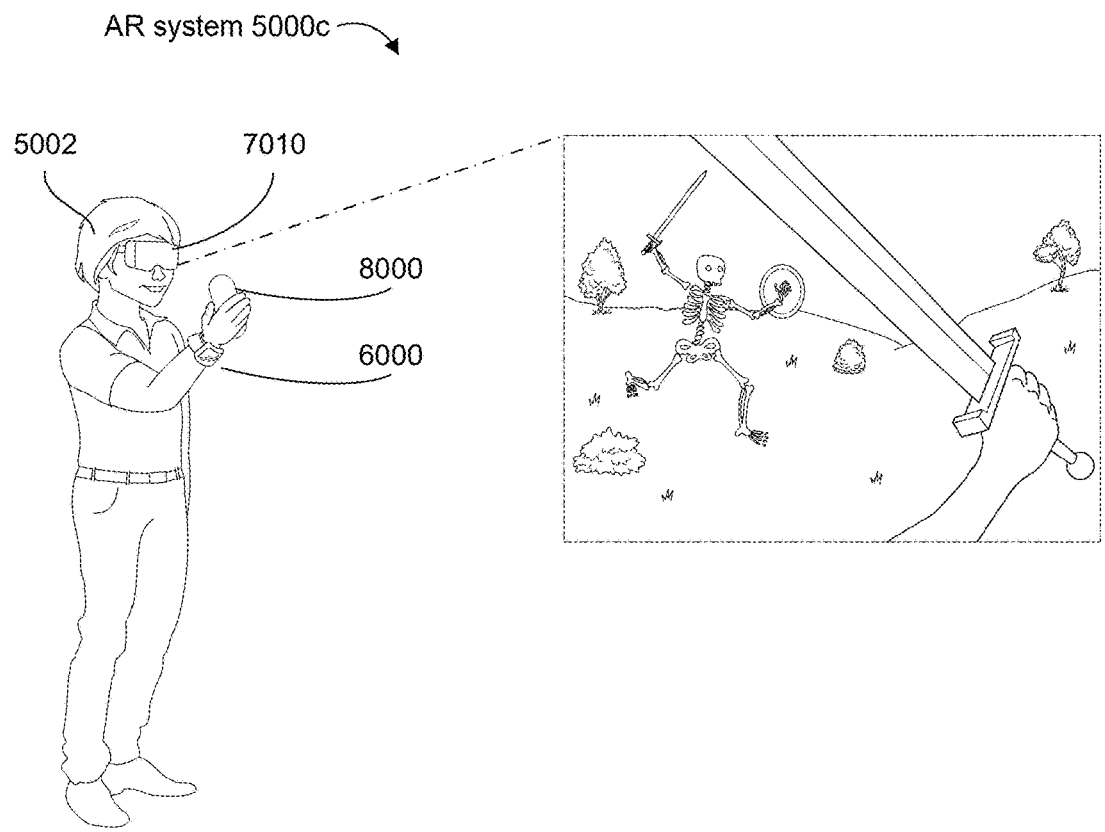
Figures 2, 7C:
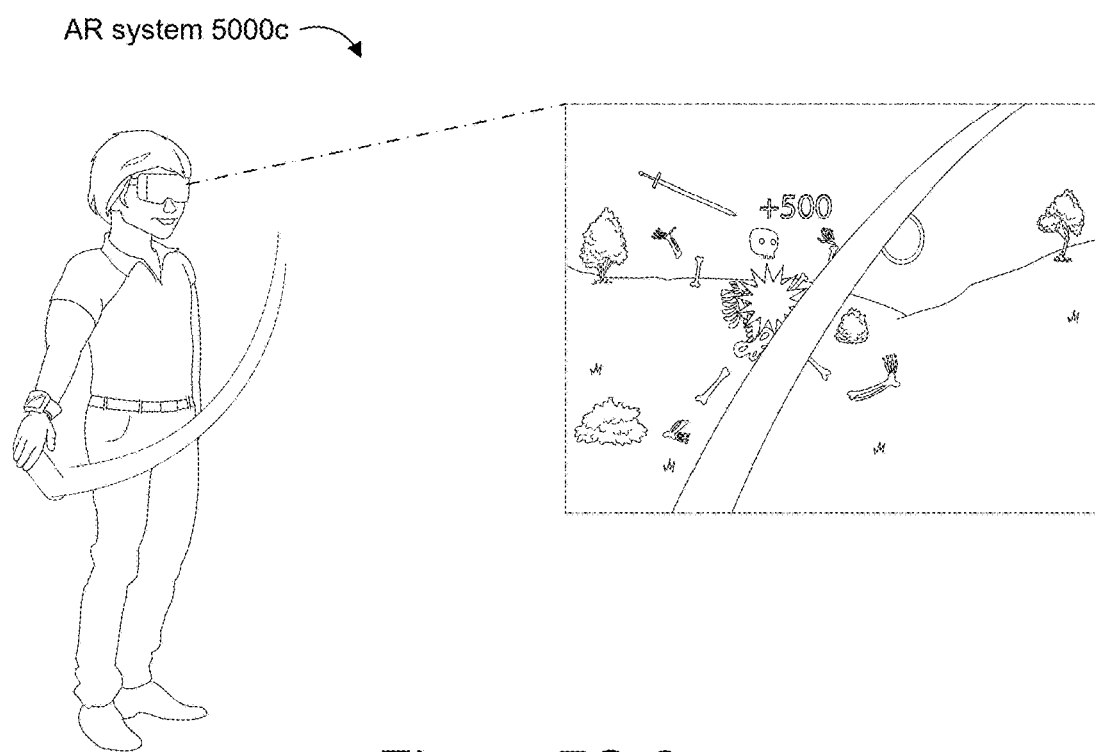
Figures 1, 7D:
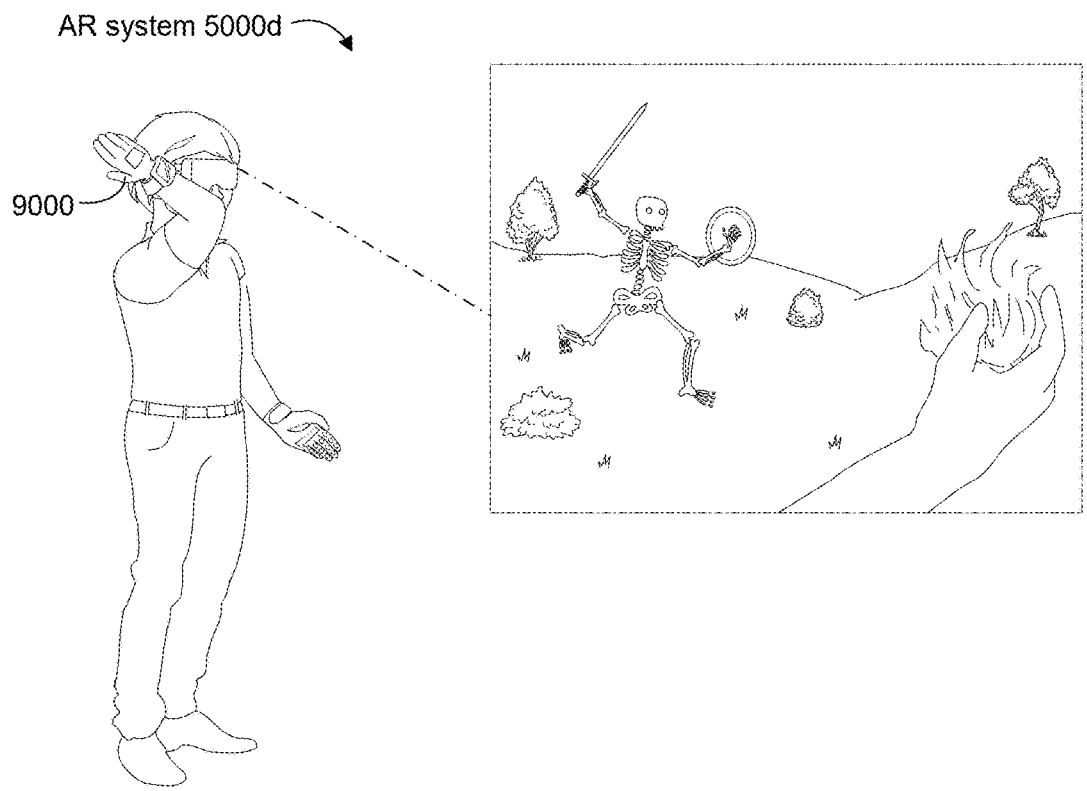
Figures 2, 7D:
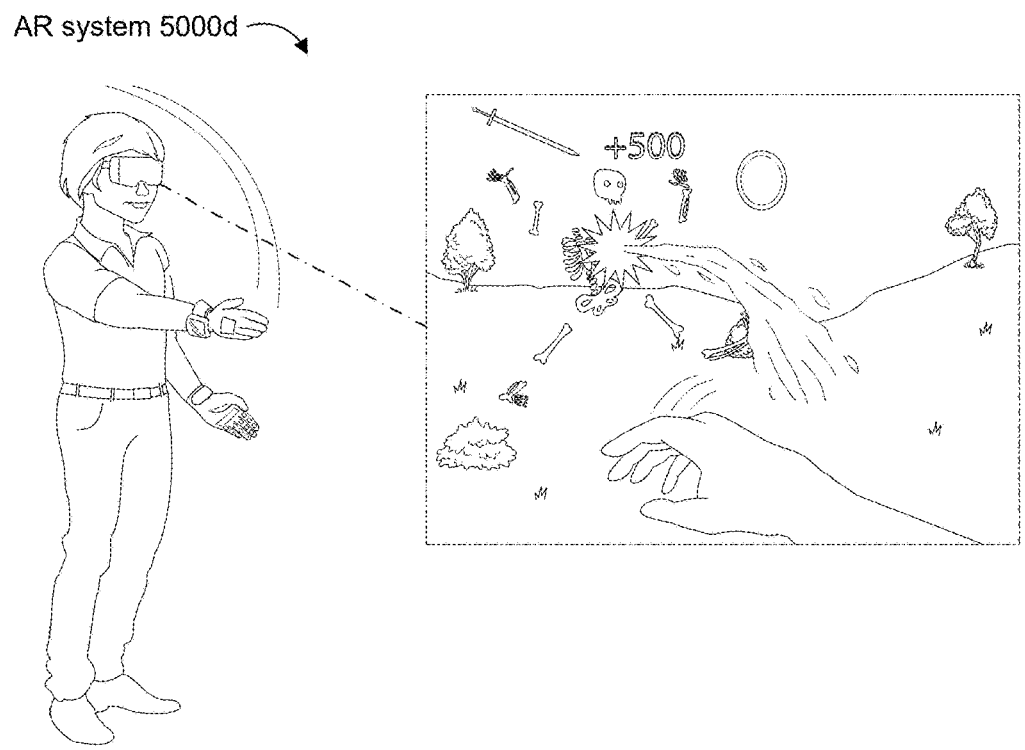

FIGS. 7A-7D illustrate example AR systems in accordance with some embodiments. FIG. 7A shows an AR system 5000a and first example user interactions using a wrist-wearable device 6000, a head-wearable device (e.g., AR system 7000), and/or a handheld intermediary processing device (HIPD) 8000. FIG. 7B shows an AR system 5000b and second example user interactions using the wrist-wearable device 6000, the AR system 7000, and/or an HIPD 8000. FIGS. 7C-1 and 7C-2 show an AR system 5000c and third example user interactions using a wrist-wearable device 6000, a head-wearable device (e.g., VR headset 7010), and/or an HIPD 8000. FIGS. 7D-1 and 7D-2 show a fourth AR system 5000d and fourth example user interactions using a wrist-wearable device 6000, VR headset 7010, and/or device 9000 (e.g., wearable haptic gloves). The above-example AR systems (described in detail below) can include the various components and/or circuits described above and/or perform the various functions and/or operations described above with reference to FIGS. 1-6.

The wrist-wearable device 6000 and its components are described below in reference to FIGS. 8A-8B; the head-wearable devices and their components are described below in reference to FIGS. 9A-9D; and the HIPD 8000 and its components are described below in reference to FIGS. 10A-10B. Wearable gloves and their components are described below in reference to FIGS. 11A-11C. As shown in FIG. 7A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops, computers, etc.), mobile devices 5050 (e.g., smartphones, tablets, etc.), and/or other electronic devices via the network 5025 (e.g., cellular, near field, Wi-Fi, personal area network, wireless LAN, etc.) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 7A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000a, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 8A-8B) and/or AR system 7000 (e.g., using one or more image sensor or camera, described below in reference to FIGS. 9A-9B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the user 5002's eyes for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is background processing task that is not perceptible by the user (e.g., rendering content, decompression, or compression), and a front-end task is a user-facing task that is perceptible to the user (e.g., presenting information to the user or providing feedback to the user). As described below in reference to FIGS. 10A-10B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000a, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 perform front-end tasks for presenting the AR video call (e.g., presenting the avatar 5004 and the digital representation of the contact 5006).

In some embodiments, the HIPD 8000 operates as a focal or anchor point for causing the presentation of information. This allows the user 5002 to be generally aware of where information is presented. For example, as shown in the AR system 5000a, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented a predetermined distance from the HIPD 8000 (e.g., within 5 meters). For example, as shown in the AR system 5000a, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 7B shows the user 5002 wearing the wrist-wearable device 6000 and the AR system 7000 and holding the HIPD 8000. In the AR system 5000b, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000b the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by user 5002's field of view 5010). In some embodiments, the application is initiated and ran on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application; initiate and run the messaging application; and provide operational data to the AR system 7000 and/or the HIPD 8000 to cause presentation of the messaging application. Alternatively, the application can be initiated and ran at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated are at another device. For example, after initiating the messaging application via the wrist-wearable device 6000 and while the AR system 7000 present the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestured performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively couple device presents one or more notifications to the user 5002. The notification can be an indication of a new message, an incoming call, an application update, or a status update. The user 5002 can select the notification via the wrist-wearable device 6000, the AR system 7000, the HIPD 8000, and cause presentation of an application or operation associated with the notification on at least one device. For example, the user 5002 can receive a notification that a message was received at the wrist-wearable device 6000, the AR system 7000, the HIPD 8000, and/or other communicatively couple device and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out, apply filters, etc.) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, and/or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); light sensors (e.g., time-of-flight sensors, infrared light sensors, visible light sensors, etc.); . . . . As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols);

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example Wrist-Wearable Devices

Figure 8A:
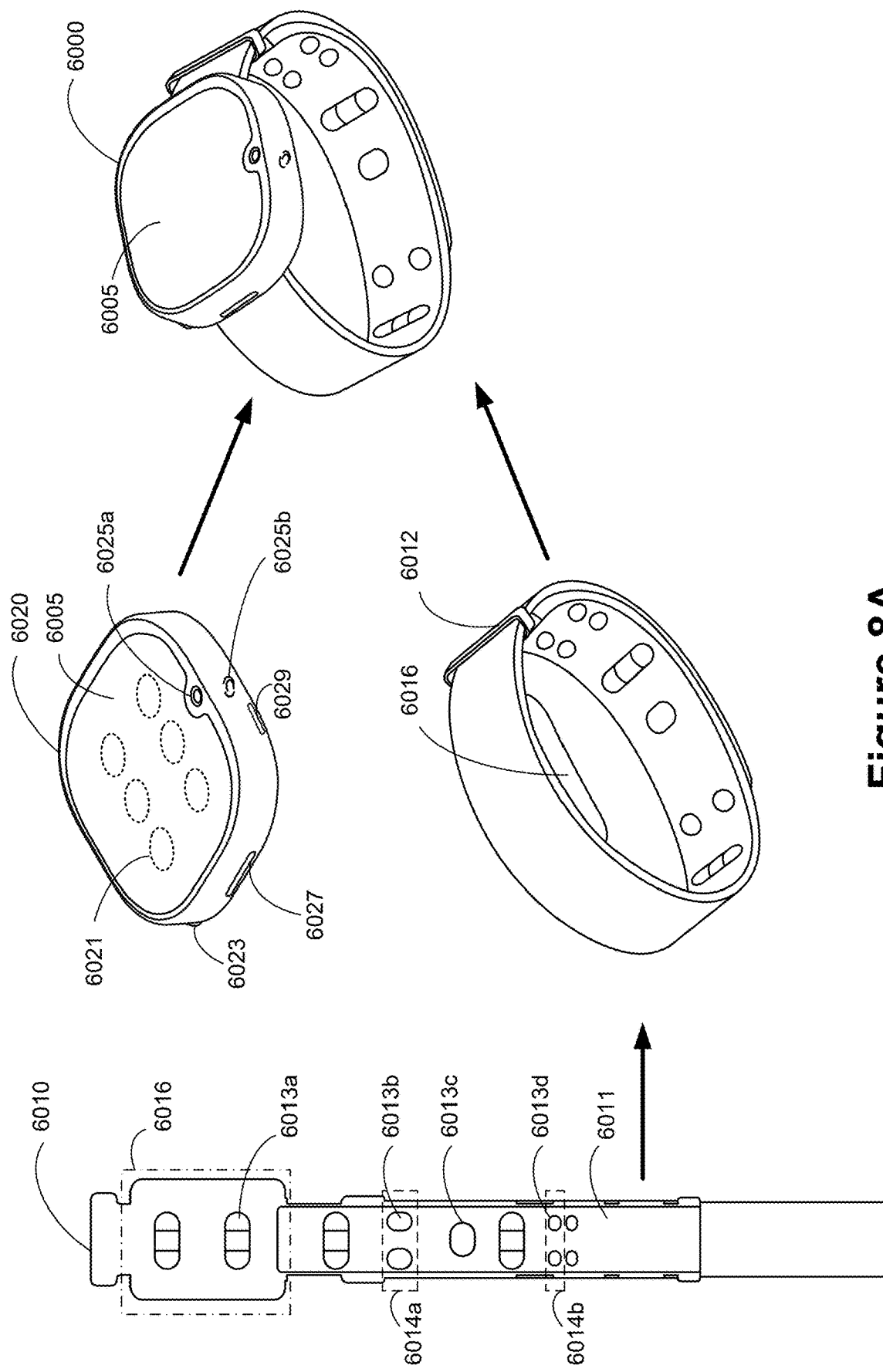
FIGS. 8A-8B illustrate an example wrist-wearable device in accordance with some embodiments.
Figure 8B:
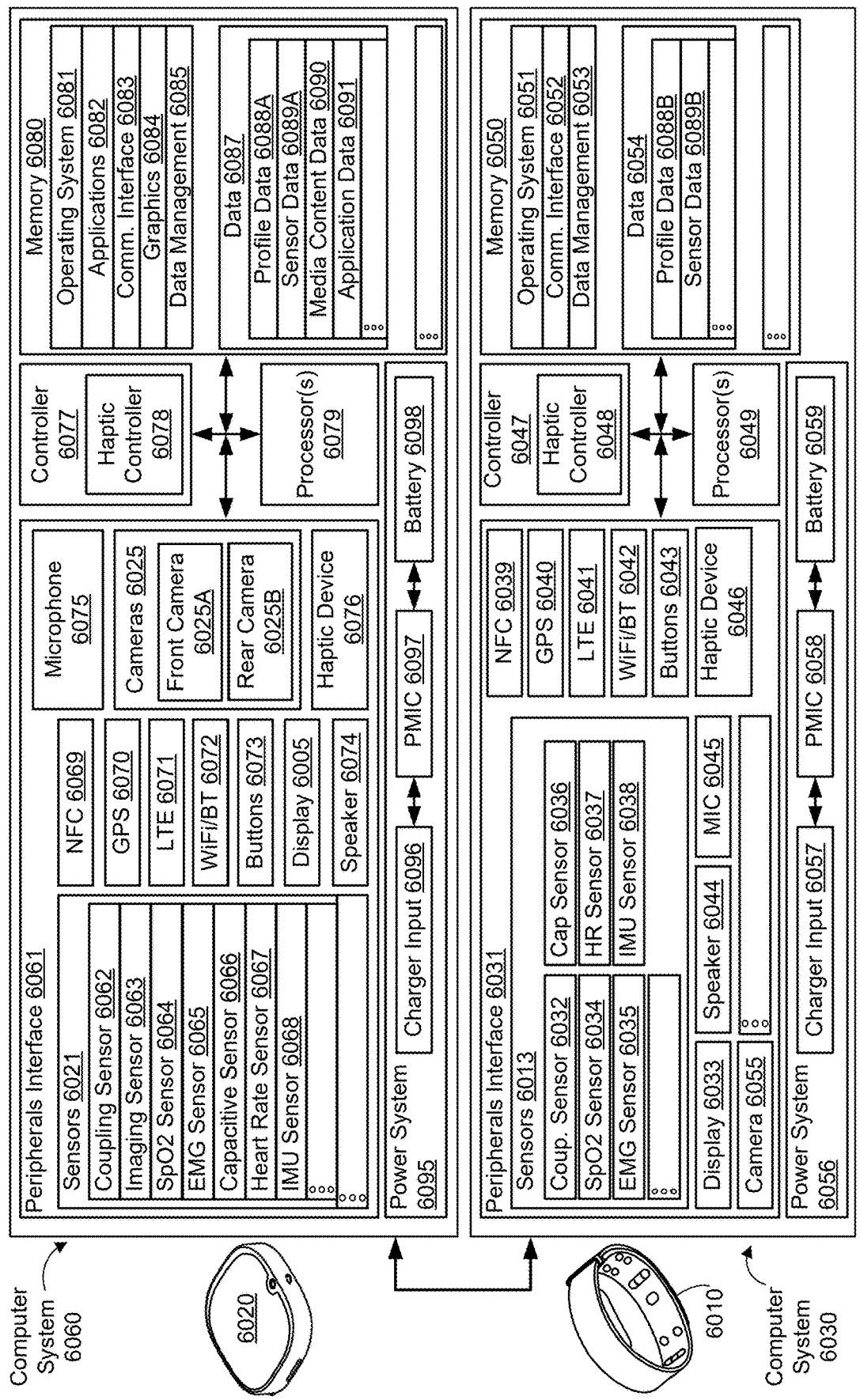

FIGS. 8A and 8B illustrate the wrist-wearable device 6000 in accordance with some embodiments. FIG. 8A illustrates components of the wrist-wearable device 6000, which can be used individually or in combination, including combinations that include other electronic devices and/or electronic components.

FIG. 8A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-6.

As will be described in more detail below, operations executed by the wrist-wearable device 6000 can include: (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; sleep monitoring; etc.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000a to 5000d). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment including a user's motion, altitude, location, orientation, gait, acceleration, position, or a combination thereof. In some embodiment, the sensors 6013 are configured to track a position and/or motion of the wearable band 6010. The one or more sensors 6013 can include any of the sensors defined above and/or discussed below with respect to FIG. 8B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 8A, the one or more sensors 6013 can be the same or distinct. For example, in some embodiments, the one or more sensors 6013 can be shaped as a pill (e.g., sensor 6013*a*), an oval, a circle a square, an oblong (e.g., sensor 6013*c*) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013*b* is aligned with an adjacent sensor to form sensor pair 6014*a* and sensor 6013*d* aligned with an adjacent sensor to form sensor pair 6014*b*. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangement of sensors 6013 depends on the particular application for which the wearable band 6010 is used. For instance, a wearable band 6010 configured as an armband, wristband, or chest-band may include a plurality of sensors 6013 with different number of sensors 6013 and different arrangement for each use case, such as medical use cases as compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1-2 mm) to make contact and depress into the user's skin. In some embodiment, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm-1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material, elastomers, etc. configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series woven strands of fabric)).

The wearable structure 6011 can include flexible electronic connectors that interconnect the sensors 6013, the electronic circuitry, and/or other electronic components (described below in reference to FIG. 8B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook and loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an artificial-reality application generated by an artificial-reality system (e.g., user interface objects presented on the display 6005, or another computing device (e.g., a smartphone)).

In some embodiments, the wearable band 6010 includes one or more haptic devices 6046 (FIG. 8B, e.g., a vibratory haptic actuator) that are configured to provide haptic feedback (e.g., a cutaneous and/or kinesthetic sensation) to the user's skin. The sensors 6013, and/or the haptic devices 6046 can be configured to operate in conjunction with multiple applications including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, adding additional sensors to improve sensed data, etc.). As described above, the wearable band 6010 (and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the is shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease a brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiment, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application and device specific information (e.g., active and/or available applications, output devices (e.g., display and/or speakers), input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 8B), a touch sensor, a sweat sensor, etc.). In some embodiments, the watch body 6020 can include one or more haptic devices 6076 (FIG. 8B; a vibratory haptic actuator) that is configured to provide haptic feedback (e.g., a cutaneous and/or kinesthetic sensation) to the user. The sensors 6021 and/or the haptic device 6076 can also be configured to operate in conjunction with multiple applications including, without limitation, health monitoring applications, social media applications, game applications, and artificial reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 10A-10B).

As described below with reference to the block diagram of FIG. 8B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or Input/Output devices.

FIG. 8B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060 are included in a single integrated circuit. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripherals interface 6061, a power system 6095, and memory (e.g., a memory 6080), each of which are defined above and described in more detail below.

The power system 6095 can include a charger input 6096, a power-management integrated circuit (PMIC) 6097, and a battery 6096, each are which are defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power system 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripherals interface 6061 can include one or more sensors 6021, many of which listed below are defined above. The sensors 6021 can include one or more coupling sensor 6062 for detecting when the watch body 6020 is coupled with another electronic device (e.g., a wearable band 6010). The sensors 6021 can include imaging sensors 6063 (one or more of the cameras 6025, and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held).

In some embodiments, the peripherals interface 6061 includes a near-field communication (NFC) component 6069, a global-position system (GPS) component 6070, a long-term evolution (LTE) component 6071, and/or a Wi-Fi and/or Bluetooth communication component 6072. In some embodiments, the peripherals interface 6061 includes one or more buttons 6073 (e.g., the peripheral buttons 6023 and 6027 in FIG. 8A), which, when selected by a user, cause operation to be performed at the watch body 6020. In some embodiments, the peripherals interface 6061 includes one or more indicators, such as a light emitting diode (LED), to provide a user with visual indicators (e.g., message received, low battery, active microphone and/or camera).

The watch body 6020 can include at least one display 6005, for displaying visual representations of information or data to the user, including user-interface elements and/or three-dimensional virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B. The cameras 6025 can include ultra-wide-angle cameras, wide angle cameras, fish-eye cameras, spherical cameras, telephoto cameras, a depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events to that are capable of being sensed by a user of the watch body 6020. In some embodiments, the one or more haptic controllers 6078 can receive input signals from an application of the applications 6082.

In some embodiments, the computer system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripherals interface 6031 that can includes one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 and in light of the definitions above. For example, sensors 6013 can include one or more coupling sensors 6032, one or more SpO2 sensor 6064, one or more EMG sensors 6065, one or more capacitive sensor 6066, one or more heart rate sensor 6067, and one or more IMU sensor 6068.

The peripherals interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076 as described above in reference to peripherals interface 6061. In some embodiments, the peripherals interface 6061 includes one or more buttons 6043, a display 6033, a speaker 6044, a microphone 6045, and a camera 6055. In some embodiments, the peripherals interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of the components. The various components shown in wearable band computing system 6030 can be implemented in one or a combination of hardware, software, firmware, including one or more signal processing and/or application-specific integrated circuits.

The wrist-wearable device 6000 with respect to FIG. 8A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture, a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIG. 8A-8B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000; and the wrist-wearable device 6000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 6000 can also be used in conjunction with a wearable garment, such as the wearable gloves described below in reference to FIGS. 11A-11C. Having thus described example wrist-wearable device, attention will now be turned to example head-wearable devices, such AR system 7000 and VR headset 7010.

Example Head-Wearable Devices

Figure 9A:
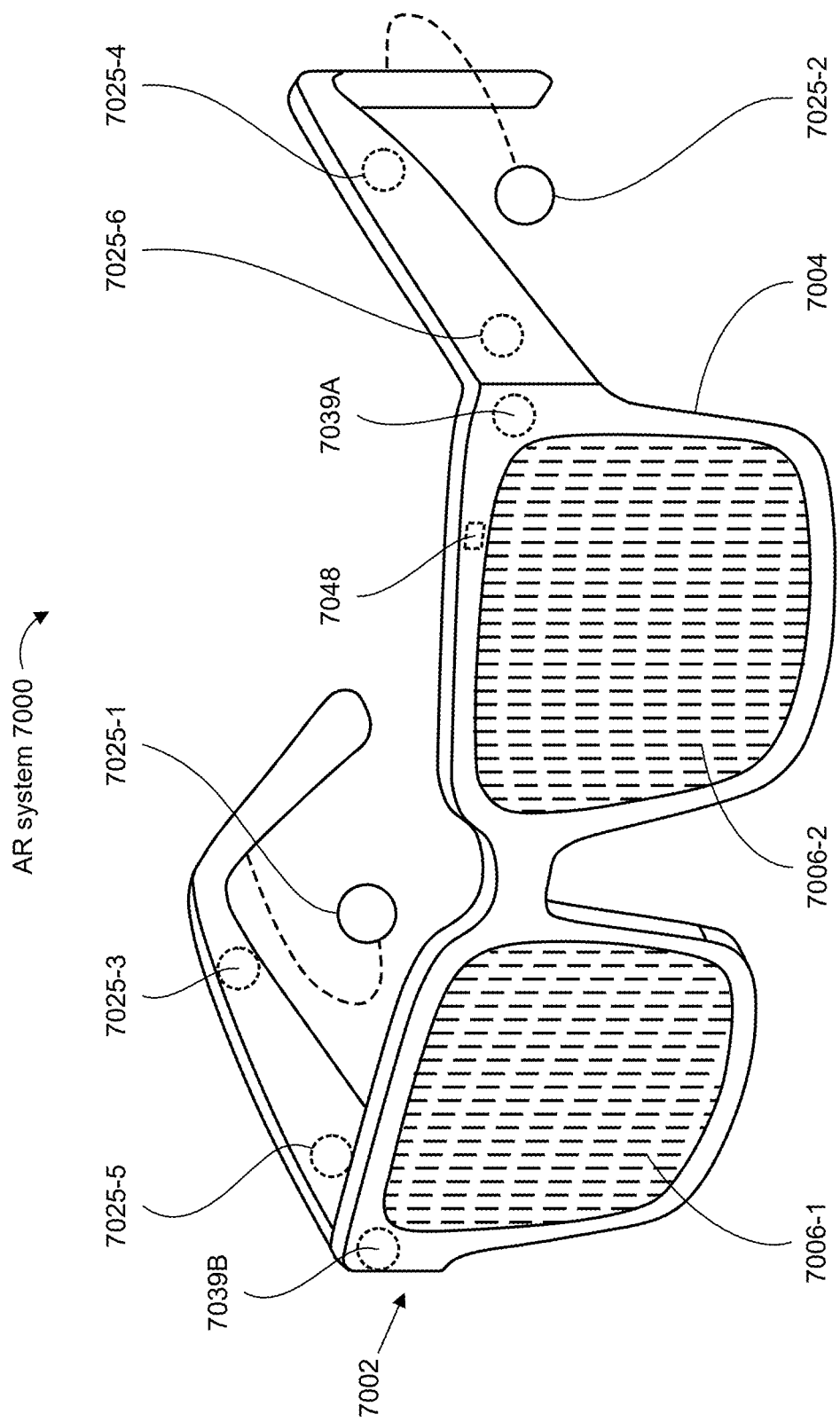
Figures 1, 9B:
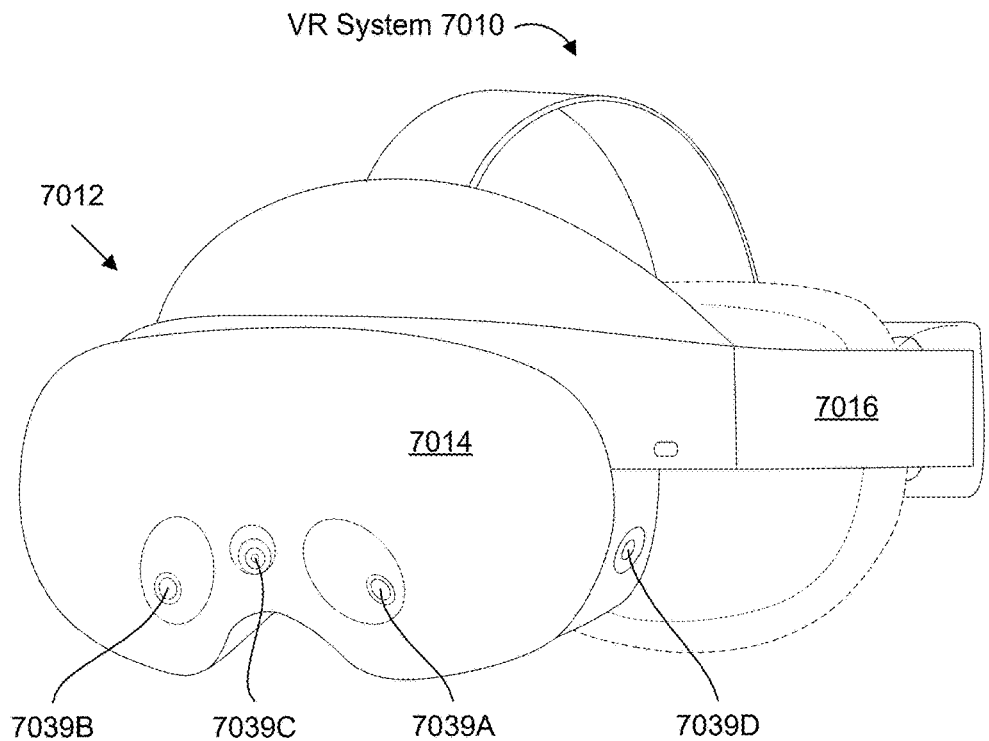
Figures 2, 9B:
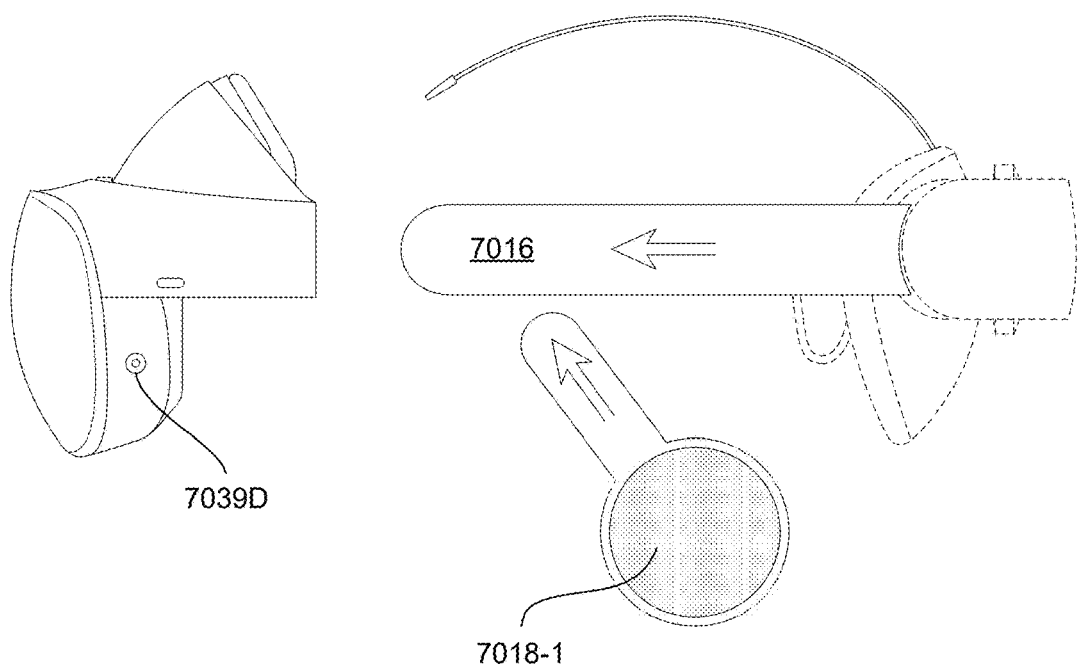
Figure 9C:
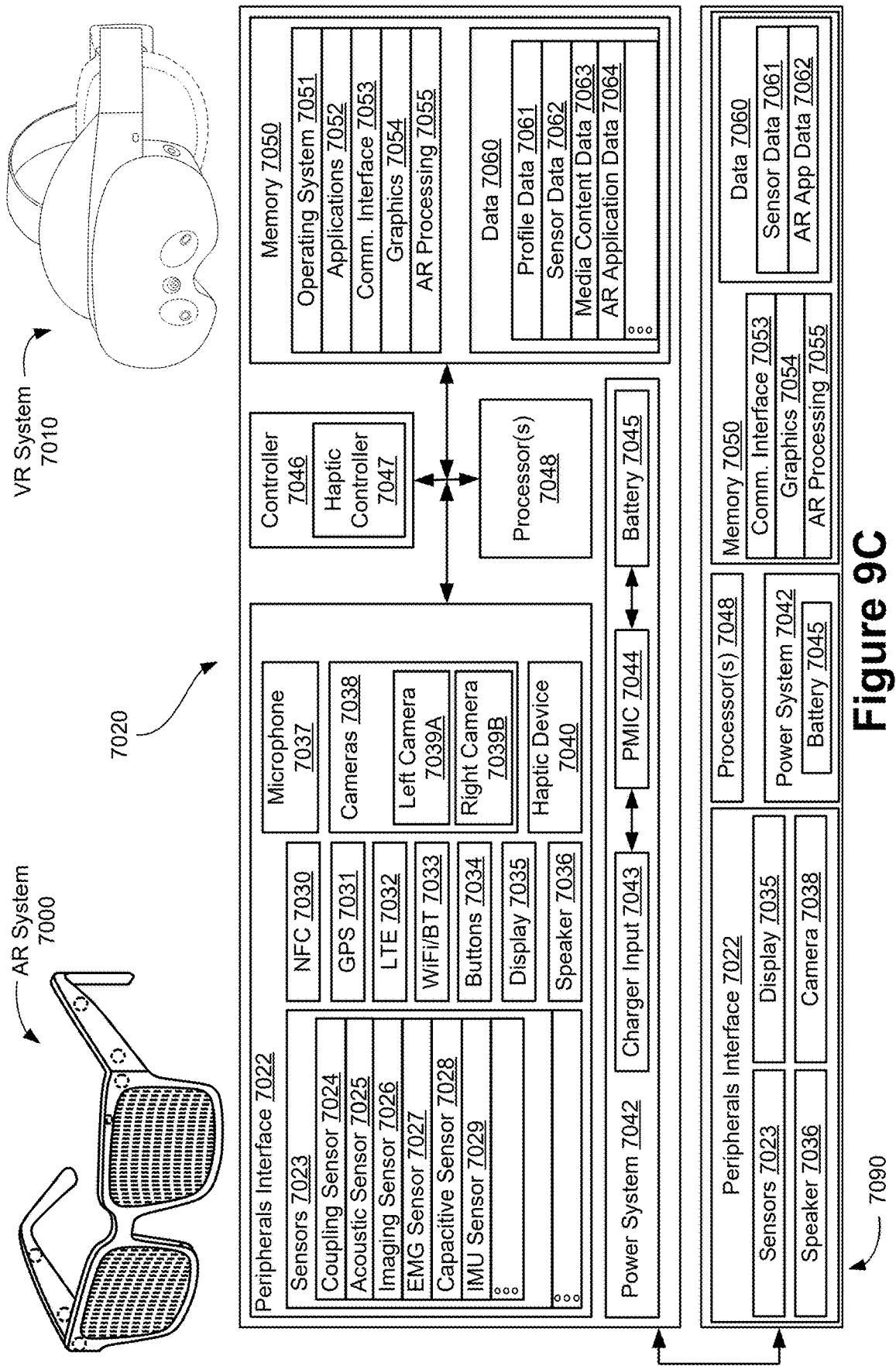

FIGS. 9A to 9C show example artificial-reality systems, including the AR system 7000. In some embodiments, the AR system 7000 is an eyewear device as shown in FIG. 9A. In some embodiments, the VR system 7010 includes a head-mounted display (HMD) 7012, as shown in FIGS. 9B-1 and 9B-2. In some embodiments, the AR system 7000 and the VR system 7010 include one or more analogous components (e.g., components for presenting interactive artificial-reality environments, such as processors, memory, and/or presentation devices, including one or more displays and/or one or more waveguides), some of which are described in more detail with respect to FIG. 9C. As described herein, a head-wearable device can include components of the eyewear device 7002, and/or the head-mounted display 7012. Some embodiments of head-wearable devices do not include any displays, including any of the displays described with respect to the AR system 7000 and/or the VR system 7010. While the example artificial-reality systems are respectively described herein as the AR system 7000 and the VR system 7010, either or both of the example AR systems described herein can be configured to present fully-immersive VR scenes presented in substantially all of a user's field of view, additionally or alternatively to, subtler augmented-reality scenes that are presented within a portion, less than all, of the user's field of view.

FIG. 9A show an example visual depiction of the AR system 7000 (which may also be described herein as augmented-reality glasses, and/or smart glasses). The AR system 7000 can include additional electronic components that are not shown in FIGS. 9A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 9A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components, such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 can include none of the mechanical components described herein. For example, smart contact lenses configured to present artificial reality to users may not include any components of the eyewear device.

The eyewear device includes electronic components, many of which will be described in more detail below with respect to FIG. 9C. Some example electronic components are illustrated in FIG. 9A, including acoustic sensors 7025-1, 7025-2, 7025-3, 7025-4, 7025-5, and 7025-1, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded into a portion of the frame 7004.

FIGS. 9B-1 and 9B-2 show a VR system 7010 that includes a head-mounted display (HMD) 7012 (e.g., also referred to herein as an artificial-reality headset, a head-wearable device, or a VR headset), in accordance with some embodiments. As noted, some artificial-reality systems may (e.g., the AR system 7000), instead of blending an artificial reality with actual reality, substantially replace one or more of a user's sensory perceptions of the real world with a virtual experience (e.g., the AR systems 5000c and 5000d).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitter or detectors). In some embodiments, the HMD 7012 includes output audio transducers (e.g., an audio transducer 7018-1), as shown in FIG. 9B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016, and/or the audio transducer 7018-1), as shown in FIG. 9B-2. In some embodiments, coupling a detachable component to the HMD 7012 causes the detachable component to come into electronic communication with the HMD 7012.

FIG. 9B-1 to 9B-2 also show that the VR system 7010 one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional IR cut filter configured to remove IR light from being received at the respective camera sensors.

FIG. 9C illustrates a computing system 7020 and an optional housing 7090, each of which show components that can be included in the AR system 7000 and/or the VR system 7010. In some embodiments, more or less components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripherals interface 7022. In some embodiments, each operation described can occur based on electrical power provided by the power system 7042.

In some embodiments, the peripherals interface 7022 can include one or more devices configured to be part of the computing system 7020, many of which have been defined above and/or described with respect to wrist-wearable devices shown in FIGS. 8A and 8B. For example, the peripherals interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029; and/or any other types of sensors defined above or described with respect to any other embodiments discussed herein.

In some embodiments, the peripherals interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including the left camera 7039A and/or a right camera 7039B), and/or one or more haptic devices 7040; and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting artificial-reality content to the user of the AR system 7000 (e.g., as a means of delivering light from one or more displays to the user's eyes). In some embodiments, one or more waveguides are fully or partially integrated into the eyewear device 7002. Additionally, or alternatively to display screens, some artificial-reality systems include one or more projection systems. For example, display devices in the AR system 7000 and/or the virtual-reality system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051; one or more applications 7052; one or more communication interface applications 7053; one or more graphics applications 7054; one or more AR processing applications 7055; and/or any other types of data defined above or described with respect to any other embodiments discussed herein.

The memory 7050 also includes data 7060 which can be used in conjunction with one or more of the applications discussed above. The data 7060 can include: profile data 7061; sensor data 7062; media content data 7063; AR application data 7064; and/or any other types of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction of arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 9C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some, or all, of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002, standing alone. Because weight carried in the wearable accessory device can be less invasive to a user than weight carried in the eyewear device 7002, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 7000 and/or the VR system 7010 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 9B-1 and 9B-2 show the VR system 7010 having cameras 7039A to 7039D, which can be used to provide depth information for creating a voxel field and a two-dimensional mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 11A to 11C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Example Handheld Intermediary Processing Devices

Figure 10A:
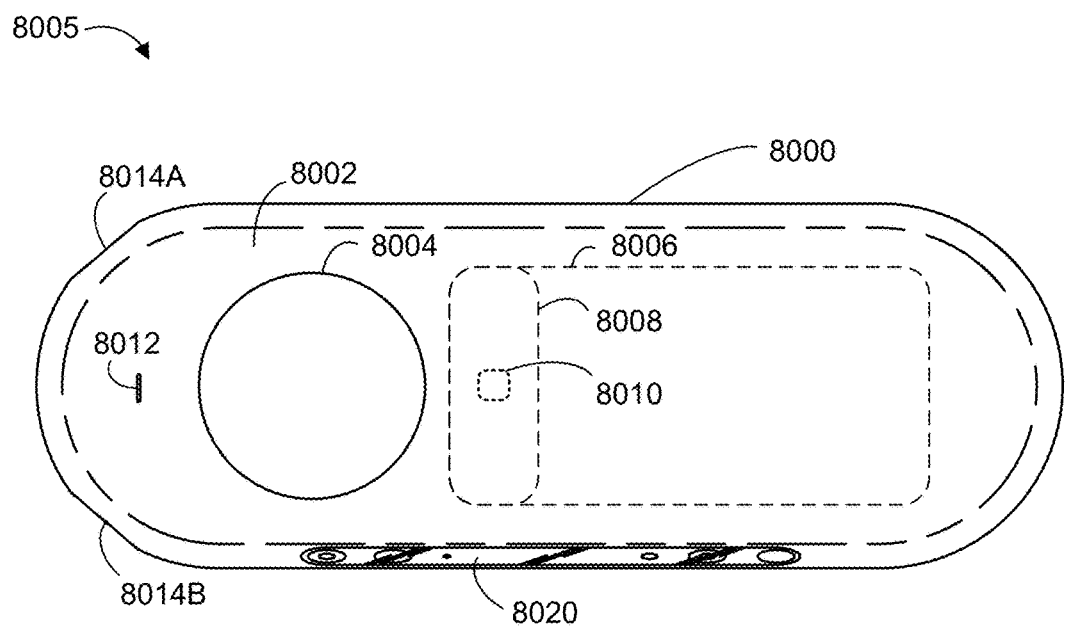
FIGS. 10A-10B illustrate an example handheld device in accordance with some embodiments.
Figure 10A:
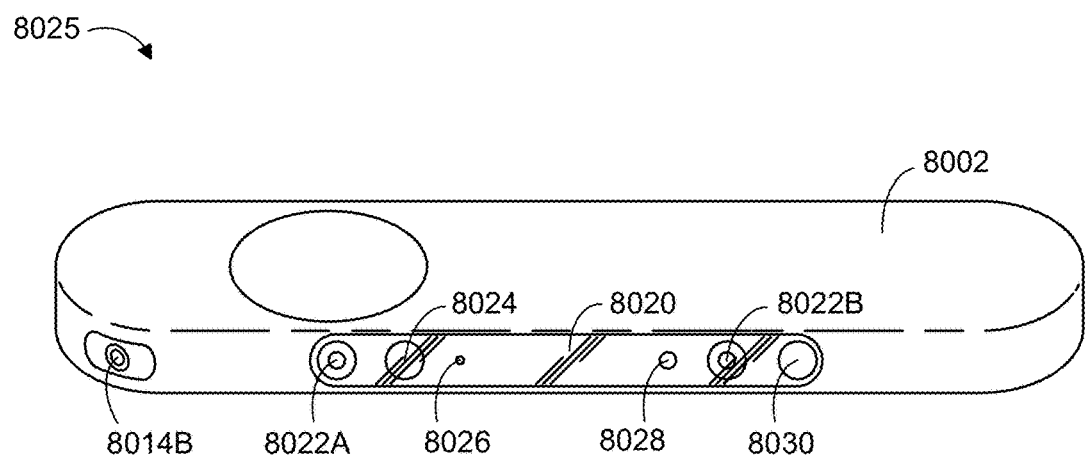
Figure 10B:
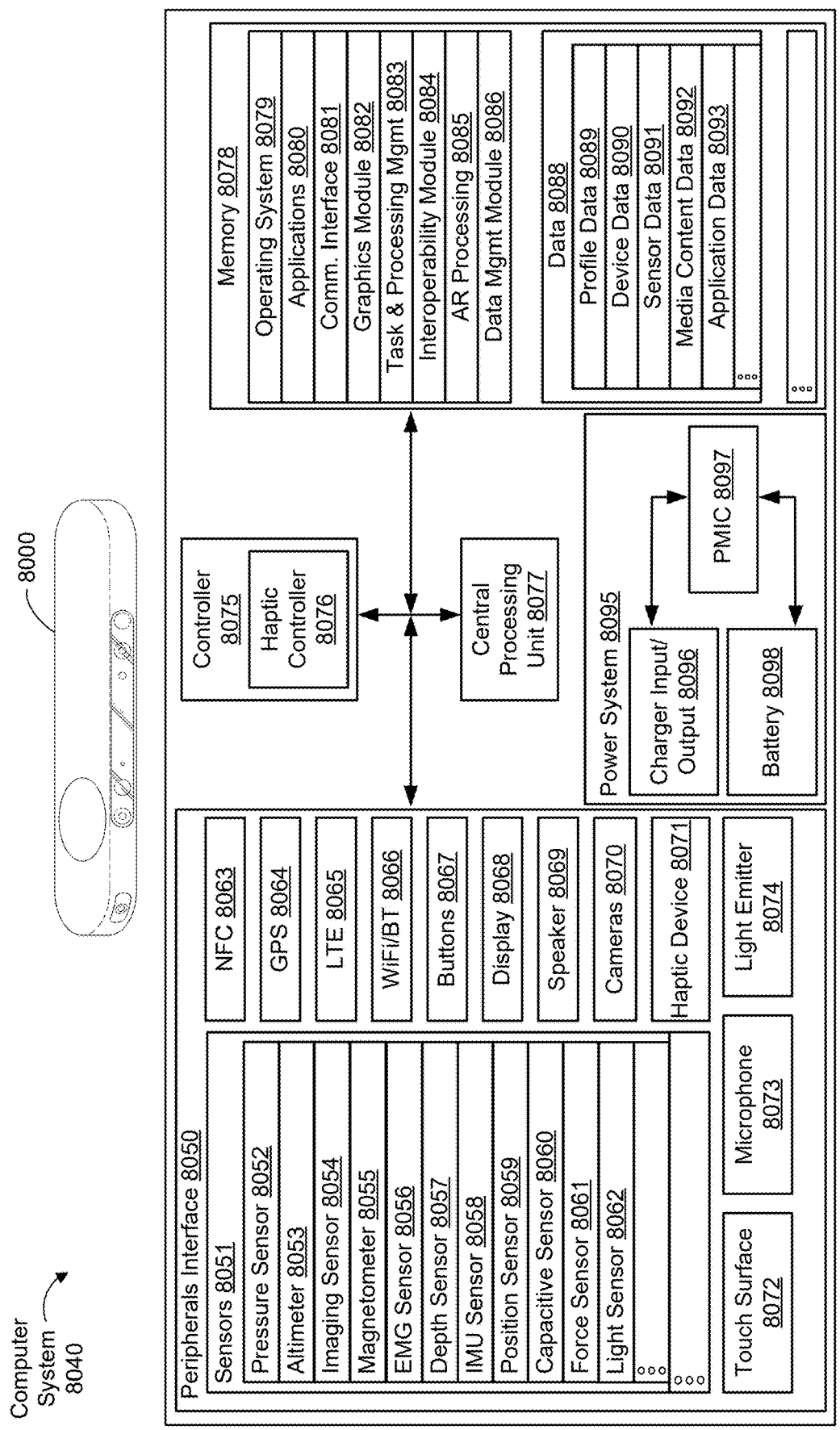

FIGS. 10A and 10B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 10A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 8000 can include, without limitation, task offloading and/or handoffs; thermals offloading and/or handoffs; 6 degrees of freedom (6DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the novel the HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides to data corresponded to the completed operations to the wearable device and/or the other electronic device. For example, a user can initiate a video stream using AR system 7000 and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input surface 8006 defined by a substantially planar portion. The touch-input surface 8004 can be disposed adjacent to the touch-input surface 8006. In some embodiments, the touch-input surface 8004 and the touch-input surface 8006 can be different dimensions, shapes, and/or cover different portions of the multi-touch input surface 8002. For example, the touch-input surface 8004 can be substantially circular and the touch-input surface 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the using imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input surface 8006 includes at least a touch-input zone 8008 within a touch-input zone 8006 and a touch-input zone 8010 within the touch-input zone 8008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for 3-dimensional object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 10B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device.

For example, a light indicator positioned around the touch-input surface 8004 can flash when the user receives a notification (e.g., a message), change red when the HIPD 8000 is out of power, operate as a progress bar (e.g., a light ring that is closed when a task is completed (e.g., 0% to 100%)), operates as a volume indicator, etc.).

In some embodiments, the HIPD 8000 includes one or more additional sensors on another surface. For example, as shown FIG. 10A, HIPD 8000 includes a set of one or more sensors (e.g., sensor set 8020) on an edge of the HIPD 8000. The sensor set 8020, when positioned on an edge of the of the HIPD 8000, can be pe positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions, such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051, and/or the haptic devices 8071 can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 8000 is configured to operate without a display. However, in optional embodiments, the HIPD 8000 can include a display 8068 (FIG. 10B). The HIPD 8000 can also income one or more optional peripheral buttons 8067 (FIG. 10B). For example, the peripheral buttons 8067 can be used to turn on or turn off the HIPD 8000. Further, the HIPD 8000 housing can be formed of polymers and/or elastomer elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 include one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device. For example, the HIPD 8000 can identify one or more back-end tasks to be performed by the HIPD 8000 and one or more front-end tasks to be performed by a communicatively coupled device. While the HIPD 8000 is configured to offload and/or handoff tasks of a communicatively coupled device, the HIPD 8000 can perform both back-end and front-end tasks (e.g., via one or more processors, such as CPU 8077; FIG. 10B). The HIPD 8000 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 10B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all, or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripherals interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripherals interface 8050 can include one or more sensors 8051. The sensors 8051 can include analogous sensors to those described above in reference to FIG. 8B. For example, the sensors 8051 can include imaging sensors 8054, (optional) EMG sensors 8056, IMU sensors 8058, and capacitive sensors 8060. In some embodiments, the sensors 8051 can include one or more pressure sensor 8052 for sensing pressure data, an altimeter 8053 for sensing an altitude of the HIPD 8000, a magnetometer 8055 for sensing a magnetic field, a depth sensor 8057 (or a time-of flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 10B.

Analogous to the peripherals described above in reference to FIGS. 8B, the peripherals interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 10A, the HIPD 8000 can optionally include a display 8068 and/or one or more buttons 8067. The peripherals interface 8050 can further include one or more cameras 8070, touch surfaces 8072, and/or one or more light emitters 8074. The multi-touch input surface 8002 described above in reference to FIG. 10A is an example of touch surface 8072. The light emitters 8074 can be one or more LEDs, lasers, etcetera, and can be used to project or present information to a user. For example, the light emitters 8074 can include light indicators 8012 and 8026 described above in reference to FIG. 10A. The cameras 8070 (e.g., cameras 8014 and 8022 described above in FIG. 10A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray casting, gaming, object manipulation, and/or other rendering; facial recognition and facial expression recognition, etc.

Similar to the watch body computing system 6060 and the watch band computing system 6030 described above in reference to FIG. 8B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripherals interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, one or more data management modules 8086, which are analogous to the software components described above in reference to FIG. 8B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, facial and facial expression, and/or recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIG. 10A-10B can be used with any device used as a human-machine interface controller. In some embodiments, an HIPD 8000 can be used in conjunction with one or more wearable device such as a head-wearable device (e.g., AR system 7000 and VR system 7010) and/or a wrist-wearable device 6000 (or components thereof). In some embodiments, an HIPD 8000 is used in conjunction with a wearable garment, such as the wearable gloves of FIGS. 11A-11C. Having thus described example HIPD 8000, attention will now be turned to example feedback devices, such as device 9000.

Example Feedback Devices

Figure 11B:
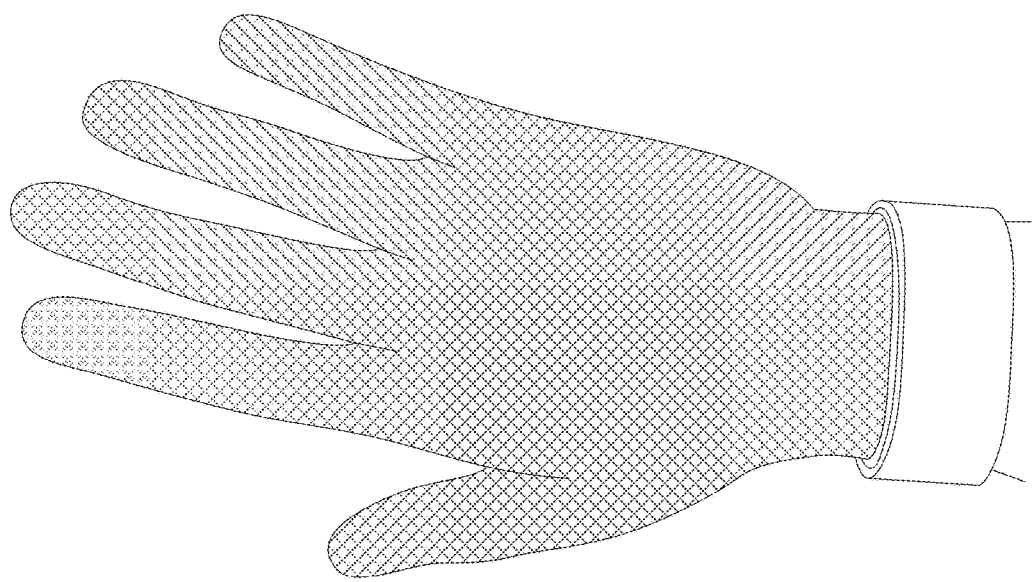
FIGS. 11A-11C illustrate example wearable gloves in accordance with some embodiments.
Figure 11A:
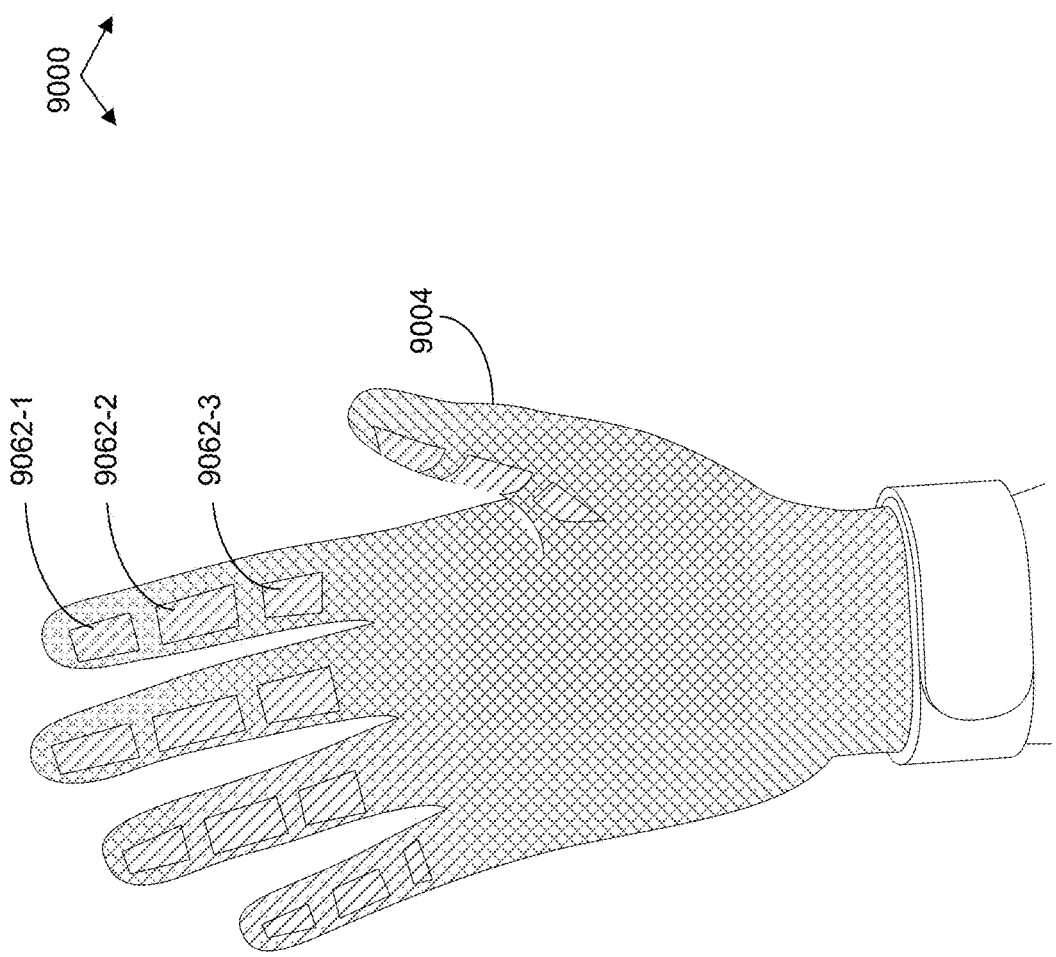

FIGS. 11A and 11B show example haptic feedback systems (e.g., hand-wearable devices) for providing feedback to a user regarding the user's interactions with a computing system (e.g., an artificial-reality environment presented by the AR system 7000 or the VR system 7010). In some embodiments, a computing system (e.g., the AR system 5000d) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to devices such as glove worn devices, body worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds, or perhaps thousands of times, during a single use. Thus, the haptic assemblies 9062 described herein are durable and designed to quickly transition from state to state. To provide some context, in the first pressurized state, the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., appendages of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while some other haptic assemblies 9062 are configured to curve or bend, at least partially.

As a non-limiting example, the device 9000 includes a plurality of haptic devices (e.g., a pair of haptic gloves, and a haptics component of a wrist-wearable device (e.g., any of the wrist-wearable devices described with respect to FIGS. 8A-8B. Each of which can include a garment component (e.g., a garment 9004) and one or more haptic assemblies coupled (e.g., physically coupled) to the garment component. For example, each of the haptic assemblies 9062-1, 9062-2, 9062-3, . . . 9062-N are physically coupled to the garment 9004 are configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 11C:
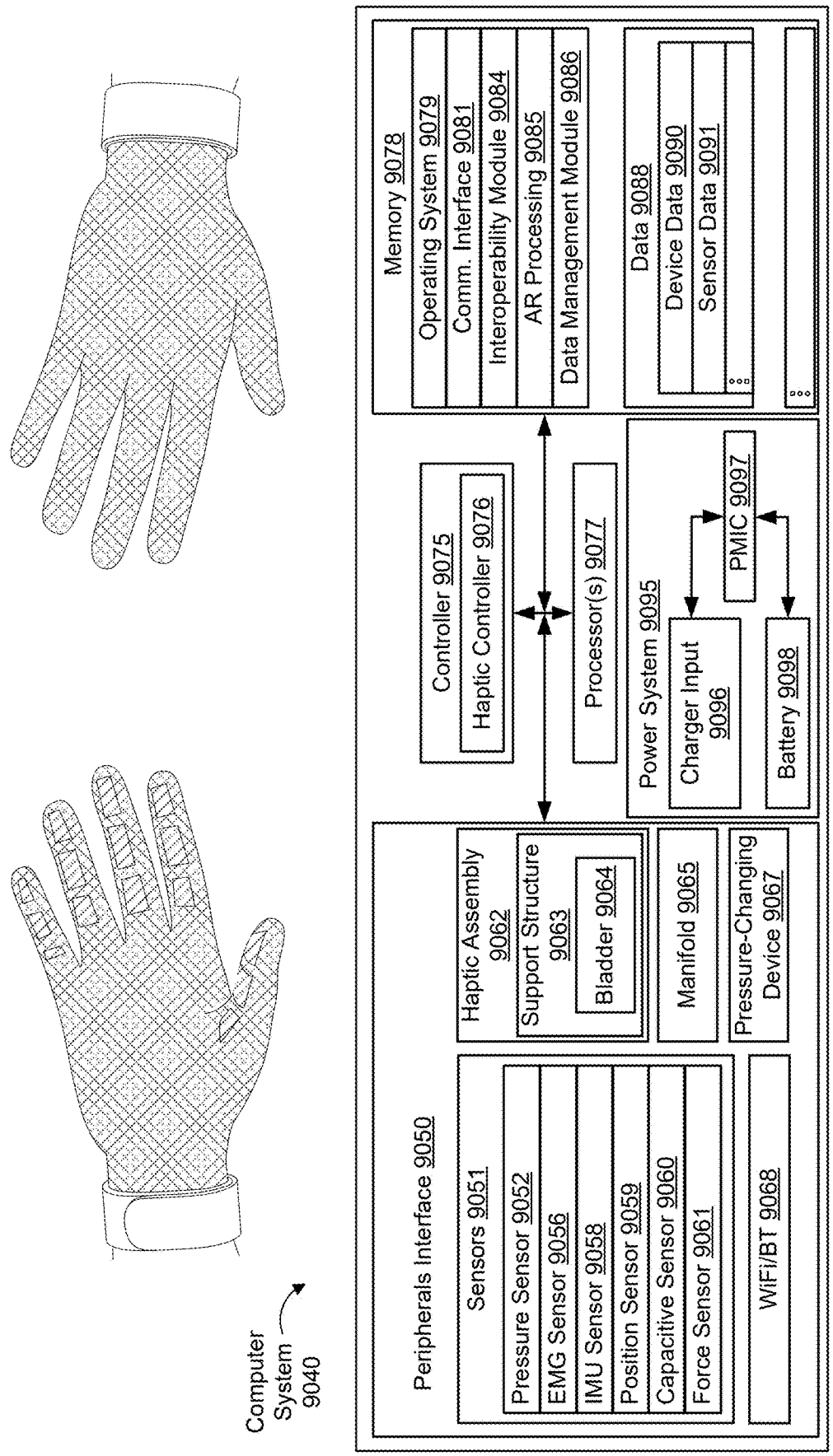

FIG. 11C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripherals interface 9050. In some embodiments, each operation described can occur based on electrical power provided by the power system 9095. The power system 9095 includes a charger input 9096, a PMIC 9097, and a battery 9098.

In some embodiments, the peripherals interface 9050 can include one or more devices configured to be part of the computing system 9040, many of which have been defined above and/or described with respect to wrist-wearable devices shown in FIGS. 8A and 8B. For example, the peripherals interface 9050 can include one or more sensors 9051. Some example sensors include: one or more pressure sensors 9052, one or more EMG sensors 9056, one or more IMU sensors 9058, one or more position sensors 9059, one or more capacitive sensors 9060, one or more force sensors 9061; and/or any other types of sensors defined above or described with respect to any other embodiments discussed herein.

In some embodiments, the peripherals interface can include one or more additional peripheral devices, including one or more Wi-Fi and/or Bluetooth devices 9068; one or more haptic assemblies 9062; one or more support structures 9063 (which can include one or more bladders 9064; one or more manifolds 9065; one or more pressure-changing devices 9067; and/or any other types of peripheral devices defined above or described with respect to any other embodiments discussed herein.

In some embodiments, each haptic assembly 9062 includes a support structure 9063, and at least one bladder 9064. The bladder 9064 (e.g., a membrane) is a sealed, inflatable pocket made from a durable and puncture resistance material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and in turn operation of the device 9000. For example, the controller 9076 sends one or more signals to the pressure-changing device 9067 to activate the pressure-changing device 9067 (e.g., turn it on and off). The one or more signals may specify a desired pressure (e.g., pounds-per-square inch) to be output by the pressure-changing device 9067. Generation of the one or more signals, and in turn the pressure output by the pressure-changing device 9067, may be based on information collected by the sensors in FIGS. 7A and 7B. For example, the one or more signals may cause the pressure-changing device 9067 to increase the pressure (e.g., fluid pressure) inside a haptic assembly 9062 at a first time, based on the information collected by the sensors in FIGS. 7A and 7B (e.g., the user makes contact with an artificial coffee mug). Then, the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A, while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated) while, in other embodiments, the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 11A to 11C may be coupled via a wired connection (e.g., via busing). Alternatively, one or more of the devices shown in FIGS. 11A to 11C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079; one or more communication interface applications 9081; one or more interoperability modules 9084; one or more AR processing applications 9085; one or more data management modules 9086; and/or any other types of data defined above or described with respect to any other embodiments discussed herein.

The memory 9078 also includes data 9088 which can be used in conjunction with one or more of the applications discussed above. The data 9088 can include: device data 9090; sensor data 9091; and/or any other types of data defined above or described with respect to any other embodiments discussed herein.

Having thus described system-block diagrams and then example devices, attention will now be directed to certain example embodiments.

EXAMPLE EMBODIMENTS

Turning now to some example embodiments of the methods, circuits, devices, and systems described earlier.

(A1) In one aspect, some embodiments include an apparatus comprising: an analog circuit (e.g., the amplifier component 220) configured to amplify biopotential signals; and a mixed-signal circuit (e.g., the compensation component 230 or the amplifier component 252) coupled to the analog circuit and configured to suppress aggressor signals before amplification of the biopotential signals. In some embodiments, the apparatus is used in conjunction with any of the biopotential sensors described herein (e.g., the EMG sensor 6035 in FIG. 8B). In some embodiments, the aggressor signals include one or more of: (i) baseline wandering signals, (ii) power-line-induced noise, (iii) digital circuitry noise, (iv) haptic motor noise, and (v) motion artifacts (e.g., due to electrodes moving on skin). For example, the apparatus may detect slow moving events e.g., (baseline wander due to skin/humidity changes), fast transitory events (e.g., motion artifacts due to electrodes moving on skin), repeated/cyclical environment noise (e.g., PLI and/or an external aggressor like a vacuum or drill motor), and self-interference (e.g., haptic noise and/or digital noise) and reduces/suppresses each of them using various detection and suppression techniques described herein.

(A2) In some embodiments of A1, the analog circuit comprises (i) an amplifier (e.g., the amplifier component 220) configured to amplify the biopotential signals and (ii) a feedback network configured to determine a gain for the amplifier (e.g., the feedback network 260).

(A3) In some embodiments of A2, the mixed-signal circuit comprises (i) an analog-to-digital circuit (e.g., the analog-to-digital component 232) coupled to an output of the analog circuit and configured to convert signals at the output of the analog circuit to digital signals, (ii) an adaptive digital circuit (e.g., the feedback component 234) coupled to the analog-to-digital circuit and configured to detect the aggressor signals in the digital signals and generate compensation signals for the amplifier, and (iii) a digital-to-analog circuit (e.g., the digital-to-analog component 236) coupled to the adaptive digital circuit and configured to output analog signals corresponding to the compensation signals to the feedback network, where the feedback network is configured to determine the gain based on the compensation signals.

(A4) In some embodiments of A3, precision and performance levels of the analog-to-digital circuit and the analog-to-digital circuit are configured based on a desired tolerance in residual aggressors after compensation and are lower than high fidelity acquisition path for the biopotential signals.

(A5) In some embodiments of any of A2-A4, the apparatus further includes a digital controller (e.g., the gain control component 282) configured to control the feedback network for adjusting the gain.

(A6) In some embodiments of any of A1-A5, the apparatus further includes a digital-to-analog converter configured to form a feedback loop through a body of a user of the apparatus to compensate for induced noise on the body (e.g., as described previously with respect to FIG. 2D).

(A7) In some embodiments of any of A1-A6, the apparatus further includes a digital-to-analog converter configured to drive potential of a body of a user of the apparatus through an analog signal generated based on digital signals output by the mixed-signal circuit (e.g., as described previously with respect to FIG. 2D).

(A8) In some embodiments of any of A1-A7, the mixed-signal circuit comprises a digital adaptation engine configured to detect amplitude and extract baseline and power-line-induced (PLI) noise, and comprises compensation loops for gain, the PLI noise and baseline wander (e.g., as described previously with respect to FIG. 2E). In some embodiments, the digital adaptation engine is configured to determine an amplitude, phase, frequency, and/or rate of change of one or more biopotential signals. In some embodiments, the digital adaptation engine is configured to extract PLI noise and/or other stationary, narrowband interference.

(A9) In some embodiments of A8, the digital adaptation engine comprises a low-resolution analog-to-digital converter (e.g., the analog-to-digital component 288).

(A10) In some embodiments of A8 or A9, the apparatus further includes a tracking circuit (e.g., the tracking component 304) coupled to the analog circuit and comprising a single-bit comparator and a digital-to-analog converter (DAC) configured to define a reference voltage for the single-bit comparator.

(A11) In some embodiments of A10, the single-bit comparator and the DAC are controlled by a digital tracking algorithm for statistically estimating aggressors from single-bit streams generated by the single-bit comparator at a sample rate defined by a clock.

(A12) In some embodiments of A10 or A11, the tracking circuit is configured to control an input code for the DAC such that it locks to a desired aggressor of the aggressor signals.

(A13) In some embodiments of any of A10-A12, the analog circuit is configured to receive the biopotential signals from an electrode of a biopotential-acquisition device (e.g., an EMG device such as EMG sensor 6065).

(A14) In some embodiments of any of A10-A13, the digital tracking algorithm is reconfigurable based on the aggressors. The benefit of a digital adaptive algorithm is that it can be designed with flexibility and desired functionalities to track the variation of the aggressors, in contrast to less flexible purely analog compensation techniques. Furthermore, digital assistance to the analog circuits enables saving area usually occupied by the passive components needed around the analog circuits, for instance by implementing large time constants digitally, rather than the use of large off-chip capacitors.

(A15) In some embodiments of any of A1-A14, the aggressor signals further comprise deterministic interferences.

(A16) In some embodiments of any of A1-A15, the aggressor signals (e.g., baseline wandering signals and interferences) are larger than the biopotential signals (e.g., the baseline wander and interference are of the order of milli-volts versus tens of micro-volts to few milli-volts for the biopotential signals).

(B1) In another aspect, some embodiments include an apparatus for processing biopotential signals. The apparatus includes (i) a plurality of analog correlators (e.g., the correlators 356), each analog correlator configured to: (a) receive time-series analog signals from an electrode of a biopotential-acquisition device; and (b) correlate the time-series analog signals with a respective filter impulse response to identify a respective degree of correlation; and (ii) a plurality of comparators (e.g., the comparators 360), each comparator coupled to a respective analog correlator and configured to detect peaks in the respective degree of correlation.

(B2) In some embodiments of B1, the plurality of analog correlators comprises analog 1-D correlators configured to operate in charge, voltage, or current domain.

(B3) In some embodiments of B1 or B2, each analog correlator is configured to correlate the time-series analog signals by applying a respective quantized weight to the time-series analog signals at a predetermined sample rate.

(B4) In some embodiments of B3, the respective quantized weight comprises a coarsely quantized weight that is quantized in amplitude.

(B5) In some embodiments of B3, the respective quantized weight comprises a coarsely quantized weight that is quantized in amplitude and time.

(B6) In some embodiments of any of B3-B5, each analog correlator is configured to apply the respective quantized weight using a multiply and add operation in analog domain, for each shift operation.

(B7) In some embodiments of any of B3-B6, each analog correlator is reprogrammable for applying a different quantized weight.

(B8) In some embodiments of any of B1-B7, each comparator is a single-bit comparator configured to compare the respective degree of correlation with a respective threshold and output a respective digital value.

(B9) In some embodiments of any of B1-B8, each comparator is reprogrammable to compare the respective degree of correlation with a different threshold.

(B10) In some embodiments of any of B1-B9, the plurality of comparators is coupled to a neural network (e.g., the neural network 368) configured to detect one or more features in the time-series analog signals.

(B11) In some embodiments of B10, the one or more features correspond to a wake-up and/or one or more gestures.

(B12) In some embodiments of B10 or B11, the neural network is coupled to a circuit configured to reduce interference noise and mitigate saturation in biopotential signals measured by the biopotential-acquisition device (e.g., the neural network 458), and the one or more features correspond to a wake-up signal for waking up the circuit.

(B13) In some embodiments of B12, the circuit is configured to be powered down when the biopotential-acquisition device is powered down and powered up by the wake-up signal.

(B14) In some embodiments of any of B10-B13, the apparatus further includes the neural network, where the plurality of analog correlators, the plurality of comparators and the neural network are implemented in a single chip.

(B15) In some embodiments of any of B1-B14, the plurality of comparators is coupled to a register configured to store an output of the plurality of comparators (e.g., the register 414).

(B16) In some embodiments of B15, the register is coupled to a remote host processor configured to retrieve the output of the plurality of comparators from the register upon receiving an interrupt.

(B17) In some embodiments of B16, the apparatus further includes the register, where the plurality of analog correlators, the plurality of comparators and the register are implemented in a single chip.

(C1) In another aspect, some embodiments include a multi-channel biopotential-acquisition system (e.g., the system shown in FIG. 5A) comprising: (i) a plurality of adaptive signal-conditioning circuits (e.g., the channels 502), each adaptive signal-conditioning circuit coupled to a respective electrode of a multi-channel biopotential-acquisition device, each signal-conditioning circuit comprising: (a) an analog circuit configured to (1) receive biopotential signals from the respective electrode and (2) amplify the biopotential signals; and (b) a mixed-signal circuit coupled to the analog circuit and configured to suppress aggressor signals comprising baseline wandering signals and power-line-induced noise in the biopotential signals before amplification of the biopotential signals; and (ii) a central processing circuit (e.g., the processing component 512) coupled to the plurality of adaptive signal-conditioning circuits, the central processing unit configured to extract raw digitized electrode signals from each channel of the multi-channel biopotential-acquisition device and program the plurality of adaptive signal-conditioning circuits.

(C2) In some embodiments of C1, the analog circuit comprises an amplifier configured to amplify the biopotential signals, where the mixed-signal circuit comprises (i) an adaptive digital circuit configured to detect the aggressor signals and generate compensation signals for the amplifier and (ii) a digital interface configured to interface with the adaptive digital circuit, and where the central processing circuit further comprises analog-to-digital data conversion circuits for converting analog signals to digital signals for the digital interface (e.g., as described previously with respect to FIG. 5A).

(C3) In some embodiments of C1, the analog circuit comprises (i) an amplifier configured to amplify the biopotential signals and (ii) a feedback network configured to determine a gain for the amplifier, where the mixed-signal circuit comprises (i) an analog-to-digital circuit coupled to an output of the analog circuit and configured to convert signals at the output of the analog circuit to digital signals, (ii) an adaptive digital circuit coupled to the analog-to-digital circuit and configured to detect the aggressor signals in the digital signals and generate compensation signals for the amplifier, and (iii) a digital-to-analog circuit coupled to the adaptive digital circuit and configured to output analog signals corresponding to the compensation signals to the feedback network, and where the feedback network is configured to determine the gain based on the compensation signals.

(C4) In some embodiments of any of $C_1$-$C_3$, the system further includes a plurality of signal pre-processing circuits (e.g., as illustrated in FIG. 5C), each signal pre-processing circuit comprising: (i) a plurality of analog correlators, each analog correlator configured to: (a) receive time-series analog signals from an electrode of the multi-channel biopotential-acquisition device; and (b) correlate the time-series analog signals with a respective filter impulse response to identify a respective degree of correlation; and (ii) a plurality of comparators, each comparator coupled to a respective analog correlator and configured to detect peaks in the respective degree of correlation.

(C5) In some embodiments of C4, the central processing circuit further comprises a neural network configured to detect one or more features in the time-series analog signals (e.g., as illustrated in FIG. 5C).

(C6) In some embodiments of C5, the one or more features correspond to a wake-up and/or one or more gestures in the biopotential signals.

(C7) In some embodiments of C5, the one or more features correspond to a wake-up signal for waking up a corresponding adaptive signal-conditioning circuit.

(C8) In some embodiments of any of C4-C7, the plurality of analog correlators comprises analog 1-D correlators configured to operate in charge, voltage, or current domain (e.g., as illustrated in FIG. 5C).

(C9) In some embodiments of any of C4-C8, each analog correlator is configured to correlate the time-series analog signals by applying a respective quantized weight to the time-series analog signals at a predetermined sample rate.

(C10) In some embodiments of any of C4-C9, each signal pre-processing circuit further comprises a neural network configured to detect one or more features in the time-series analog signals (e.g., as illustrated in FIG. 5D).

(C11) In some embodiments of any of C1-C10, the system further includes a plurality of neural networks, each neural network configured to extract features (e.g., features for gesture detection) from biopotential signals for a respective electrode (e.g., as described previously with respect to FIG. 5E).

(C12) In some embodiments of C11, the plurality of adaptive signal-conditioning circuits and the central processing circuit are configured to communicate using metadata based on the features.

(C13) In some embodiments of C11 or C12, the features are based on a physical location of the respective electrode.

(C14) In some embodiments of any of C1-C13, the system further includes a plurality of impedance measurement circuits configured to estimate impedance due to the plurality of adaptive signal-conditioning circuits (e.g., as described previously with respect to FIG. 6).

(C15) In some embodiments of C14, each impedance measurement circuit corresponds to a respective channel of the multi-channel biopotential-acquisition device.

(C16) In some embodiments of C14 or C15, each impedance measurement circuit includes a circuit configured to inject at least one of direct current (DC) and alternating current (AC) signals into an electrode of the multi-channel biopotential-acquisition device.

(C17) In some embodiments of any of C14-C16, each impedance measurement circuit includes a quadrature detection hardware for impedance measurement.

(C18) In some embodiments of any of C14-C17, each impedance measurement circuit corresponds to a respective channel of a plurality of channels of the multi-channel biopotential-acquisition device, where at least one impedance measurement circuit includes a circuit configured to inject at least one of direct current (DC) and alternating current (AC) signals for another channel of the multi-channel biopotential-acquisition device different from the channel corresponding to the at least one impedance measurement circuit.

(C19) In some embodiments of any of C14-C18, each impedance measurement circuit corresponds to a respective channel of a plurality of channels of the multi-channel biopotential-acquisition device, where at least one impedance measurement circuit includes a quadrature detection hardware for impedance measurement for another channel of the multi-channel biopotential-acquisition device different from the channel corresponding to the at least one impedance measurement circuit.

(C20) In some embodiments of any of C14-C19, the plurality of impedance measurement circuits is configured for calibration in a rotational basis (e.g., at power up or in a time-multiplexed fashion).

In another aspect, some embodiments include a computing system (e.g., a wearable device (such as a wrist-wearable device or arm-worn device), intermediary device (which can be configured to perform processor-intensive operations for a system that includes a wrist-wearable device and a head-worn wearable device), or combination thereof) including any of the circuits, apparatuses, or biopotential-acquisition systems described herein (e.g., A1-A16, B1-B17, and C1-C20 above).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. An apparatus comprising:
   an analog circuit configured to amplify biopotential signals; and
   a mixed-signal circuit coupled to the analog circuit and configured to suppress aggressor signals before amplification of the biopotential signals, the aggressor signals comprising one or more of: (i) a baseline wandering signal, (ii) a transitory event signal, (iii) a repeating environmental noise signal, and (iv) a self-interference signal, wherein the mixed-signal circuit comprises a digital adaptation engine configured to:
detect amplitudes of the aggressor signals; and
extract baseline wandering signals and power-line-induced (PLI) noise signals from the aggressor signals.

2. The apparatus of claim 1, wherein the analog circuit comprises (i) an amplifier configured to amplify the biopotential signals and (ii) a feedback network configured to adjust gain for the amplifier.

3. The apparatus of claim 2, wherein the mixed-signal circuit comprises (i) an analog-to-digital component coupled to an output of the analog circuit and configured to convert signals at the output of the analog circuit to digital signals, (ii) an adaptive digital circuit coupled to the analog-to-digital component and configured to detect the aggressor signals in the digital signals and generate compensation signals for the amplifier, and (iii) a digital-to-analog component coupled to the adaptive digital circuit and configured to output analog signals corresponding to the compensation signals to the feedback network, wherein the feedback network is configured to adjust the gain based on the compensation signals.

4. The apparatus of claim 2, wherein the mixed-signal circuit comprises a digital controller configured to control the feedback network for adjusting the gain.

5. The apparatus of claim 1, further comprising a digital-to-analog converter configured to drive a potential of a body of a user of the apparatus via an analog signal generated based on digital signals output by the mixed-signal circuit.

6. The apparatus of claim 1, further comprising a tracking circuit coupled to the analog circuit, the tracking circuit comprising a single-bit comparator and a digital-to-analog converter (DAC) configured to define a reference voltage for the single-bit comparator.

7. The apparatus of claim 6, wherein the single-bit comparator and the DAC are controlled by a digital tracking algorithm for statistically estimating aggressors from single-bit streams generated by the single-bit comparator at a sample rate defined by a clock.

8. The apparatus of claim 6, wherein the tracking circuit is configured to control an input code for the DAC such that it locks to a desired aggressor of the aggressor signals.

9. The apparatus of claim 1, wherein the apparatus is a wearable device.

10. A non-transitory computer-readable storage medium including instructions configured to cause an apparatus to:
obtain a plurality of biopotential signals;
extract baseline wandering signals and power-line-induced (PLI) noise signals from the plurality of biopotential signals;
suppress one or more aggressor signals from the plurality of biopotential signals, the one or more aggressor signals comprising the baseline wandering signals and the PLI noise signals; and
after suppressing the one or more aggressor signals, amplify the plurality of biopotential signals.

11. The non-transitory computer-readable storage medium of claim 10, wherein suppressing the one or more aggressor signals includes:
converting the plurality of biopotential signals to a plurality of digital signals;
detecting the one or more aggressor signals in the plurality of digital signals;
generating one or more compensation signals; and
determining a gain for the plurality of biopotential signals based on the one or more compensation signals.

12. The non-transitory computer-readable storage medium of claim 11, wherein the one or more compensation signals are generated using an adaptive digital algorithm.

13. The non-transitory computer-readable storage medium of claim 10, wherein suppressing the one or more aggressor signals includes cancelling at least a portion of the one or more aggressor signals by combining the plurality of biopotential signals with one or more compensation signals.

14. The non-transitory computer-readable storage medium of claim 10, wherein the instructions further cause the apparatus to drive a potential of a body of a user of the apparatus via an analog signal generated based on the one or more aggressor signals.

15. The non-transitory computer-readable storage medium of claim 10, wherein amplifying the plurality of biopotential signals comprises adjusting a gain of an amplifier component based on output of a feedback network.

16. A method of amplifying biopotential signals, the method comprising:
obtaining a plurality of biopotential signals;
extracting baseline wandering signals and power-line-induced (PLI) noise signals from the plurality of biopotential signals;
suppressing one or more aggressor signals from the plurality of biopotential signals, the one or more aggressor signals comprising the baseline wandering signals and the PLI noise signals; and
after suppressing the one or more aggressor signals, amplifying the plurality of biopotential signals.

17. The method of claim 16, wherein suppressing the one or more aggressor signals includes:
converting the plurality of biopotential signals to a plurality of digital signals;
detecting the one or more aggressor signals in the plurality of digital signals;
generating one or more compensation signals; and
determining a gain for the plurality of biopotential signals based on the one or more compensation signals.

18. The method of claim 17, wherein the one or more compensation signals are generated using an adaptive digital algorithm.

19. The method of claim 16, wherein amplifying the plurality of biopotential signals comprises adjusting a gain of an amplifier component based on output of a feedback network.

20. The method of claim 16, wherein suppressing the one or more aggressor signals includes cancelling at least a portion of the one or more aggressor signals by combining the plurality of biopotential signals with one or more compensation signals.

* * * * *